United States Patent
Tedjamulia et al.

(10) Patent No.: US 9,595,068 B2
(45) Date of Patent: Mar. 14, 2017

(54) SOCIAL MARKETPLACE AFFILIATE ADMINISTRATION

(75) Inventors: Steven Tedjamulia, Austin, TX (US); Manish C. Mehta, Austin, TX (US); Ronald Vincent Rose, Austin, TX (US); Andrew Tobias Siemer, Elgin, TX (US)

(73) Assignee: Dell Products L.P., Round Rock, TX (US)

( * ) Notice: Subject to any disclaimer, the term of this patent is extended or adjusted under 35 U.S.C. 154(b) by 524 days.

(21) Appl. No.: 13/183,958

(22) Filed: Jul. 15, 2011

(65) Prior Publication Data

US 2012/0290431 A1    Nov. 15, 2012

Related U.S. Application Data

(60) Provisional application No. 61/485,767, filed on May 13, 2011.

(51) Int. Cl.
*G06Q 30/00* (2012.01)
*G06Q 50/00* (2012.01)
*G06Q 30/02* (2012.01)
*G06Q 30/06* (2012.01)

(52) U.S. Cl.
CPC ......... *G06Q 50/01* (2013.01); *G06Q 30/0282* (2013.01); *G06Q 30/0631* (2013.01)

(58) Field of Classification Search
CPC .......................................... G06Q 30/06–30/08
USPC ................................................ 705/26.1–27.2
See application file for complete search history.

(56) References Cited

U.S. PATENT DOCUMENTS

| | | | |
|---|---|---|---|
| 2009/0125588 A1* | 5/2009 | Black et al. | 709/204 |
| 2011/0004533 A1* | 1/2011 | Soto et al. | 705/27.1 |
| 2011/0106746 A1* | 5/2011 | Ventilla et al. | 706/50 |
| 2011/0238699 A1* | 9/2011 | Chang et al. | 707/780 |

OTHER PUBLICATIONS

"KickApps and IBM Integrate Platforms to Deliver Revolutionary Social Commerce Solution" (Business Wire, Jul. 1, 2010).*

* cited by examiner

*Primary Examiner* — Ethan D Civan
(74) *Attorney, Agent, or Firm* — Terrile, Cannatti, Chambers & Holland, LLP; Stephen A. Terrile

(57) ABSTRACT

A method and system are disclosed for managing social commerce within a social media environment. Social commerce activity data corresponding to social commerce storefronts associated with various affiliates is processed to generate social commerce analysis data associated with a merchant's products. The social commerce analysis data is then processed to generate recommendations, which are then provided to the various affiliates. The recommendations are then provided to users of a social media environment to incent additional social commerce activity.

20 Claims, 28 Drawing Sheets

SOCIAL MARKETPLACE AFFILIATE ADMINISTRATION

CROSS-REFERENCE TO RELATED APPLICATION

This application claims the benefit under 35 U.S.C. §119 (e) of U.S. Provisional Application No. 61/485,767, filed May 13, 2011, entitled "Social Marketplace." U.S. Provisional Application No. 61/485,767 includes exemplary systems and methods and is incorporated by reference in its entirety.

BACKGROUND OF THE INVENTION

Field of the Invention

Embodiments of the invention relate generally to information handling systems. More specifically, embodiments of the invention provide a method and system for managing social commerce within a social media environment.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

These same information handling systems have played a key role in the rapid growth of electronic commerce on the Internet. One known aspect of electronic commerce is affiliate networks, which allow online merchants to reach a larger audience through participation in various affiliate programs. Typically, potential customers are referred to the merchant's website from an affiliate's web site, which receives a share of any resulting sale as compensation for the referral. Various affiliate network services and benefits generally include referral tracking, reporting tools, payment processing, and access to a large base of participants. Over time, affiliate networks have made progress in simplifying the process of registering affiliate participants fore or more merchant affiliate programs. However, affiliates still face integration challenges when attempting to provide their users a customized subset of the merchant's website.

In recent years, information handling systems have also been instrumental in the widespread adoption of social media into the mainstream of everyday life. Social media commonly refers to the use of web-based technologies for the creation and exchange of user-generated content for social interaction. As such, it currently accounts for approximately 22% of all time spent on the Internet. More recently, various aspects of social media have become an increasingly popular for enabling customer feedback, and by extension, have likewise evolved into a viable marketing channel for vendors. This new marketing channel, sometimes referred to as "social marketing," has proven to not only have a higher customer retention rate than traditional marketing channels, but to also provide higher demand generation "lift."

Currently, social marketing is typically limited to providing a link from a social media environment to the home page of a merchant's website, where a referred user can then search for a recommended product. In some cases, the user may be referred to a predetermined product page or listing. However, no known ability is currently available for a social marketer to refer a user to a customized subset of a merchant's products. Furthermore, social marketers generally lack real-time integration with the merchant's site. As a result, they typically have to rely upon the merchant's traditional methods of referral tracking, reporting, accounting and payment processing. Moreover, there is a lack of simplified integration between merchant websites, affiliate networks, and social media environments, which pose challenges in realizing the promise of social marketing.

SUMMARY OF THE INVENTION

A method and system are disclosed for managing social commerce within a social media environment. In various embodiments, a social commerce marketplace system is implemented for affiliates of a merchant to conduct social commerce within a social commerce environment. In these and other embodiments, social commerce activity data corresponding to social commerce storefronts associated with various affiliates is processed to generate social commerce analysis data associated with a merchant's products. In these various embodiments, the social commerce data is processed to generate recommendations, which are then provided to users of a social media environment to incent additional social commerce activity.

In one embodiment, the social commerce analysis data comprises product purchase data corresponding to a purchase of a first product by a user of a social media environment. In this embodiment, the social commerce recommendation data is provided by an affiliate to the user and may comprise a recommendation to purchase a second product. In another embodiment, the social commerce analysis data comprises search term data used by the user that corresponds to the purchase of the first product. In this and other embodiments, the social commerce recommendation data is provided by an affiliate to the user and may comprise a promotional offer.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A method and system are disclosed for managing social commerce within a social media environment. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
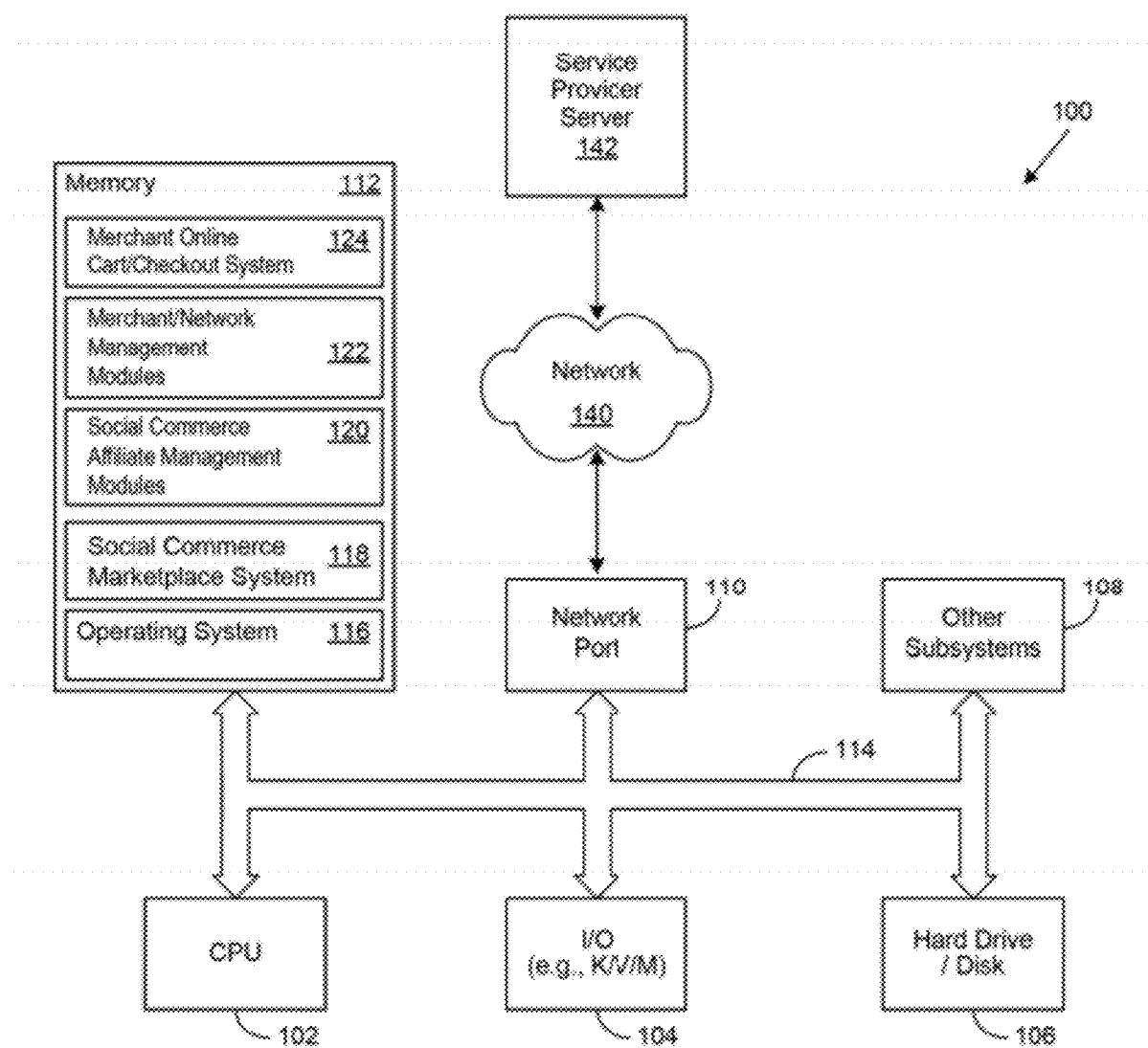
FIG. 1 is a generalized illustration of the components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a social commerce marketplace system 118, a plurality of social commerce affiliate management modules 120, a plurality of merchant/network management modules 122, and a merchant online cart/checkout system 124. In one embodiment, the information handling system 100 is able to download the social commerce marketplace system 118, the plurality of social commerce affiliate management modules 120, the plurality of merchant/network management modules 122, and the merchant online cart/checkout system 124 from the service provider server 142. In another embodiment, the social commerce marketplace system 118, the plurality of social commerce affiliate management modules 120, the plurality of merchant/network management modules 122, and the merchant online cart/checkout system 124 is provided as a service from the service provider server 142.

Figure 2:
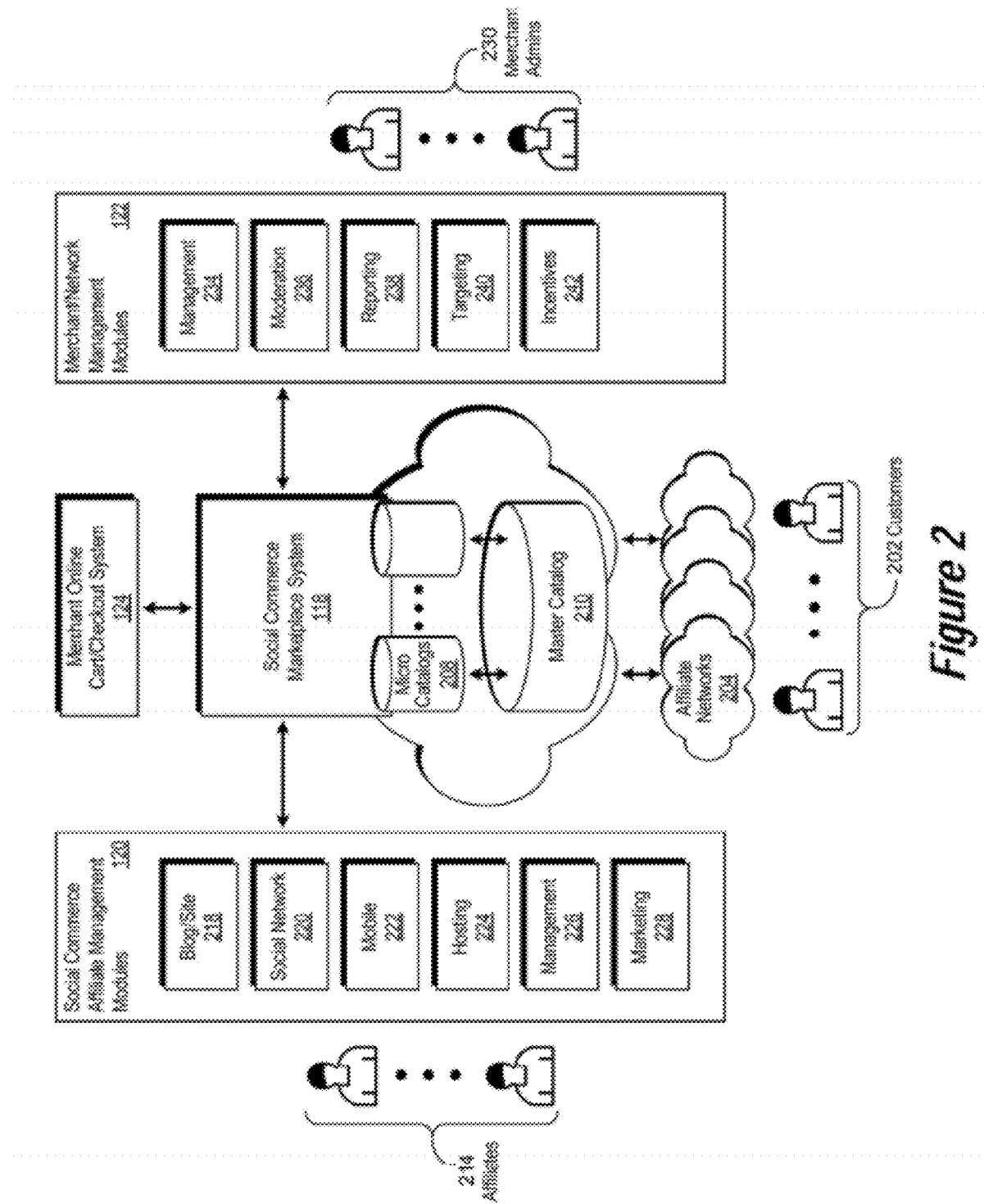
FIG. 2 is a simplified block diagram showing the implementation of a social commerce marketing system.

FIG. 2 is a simplified block diagram showing the implementation of a social commerce marketing system in accordance with an embodiment of the invention. In this embodiment, a social commerce marketplace system 118 is implemented with a plurality of social commerce affiliate management modules 120, a plurality of merchant/network management modules 122, a merchant online cart/checkout system 124. In these and other embodiments, the plurality of social commerce affiliate management modules 120 are accessed and used by a plurality of affiliates 214. Likewise, the plurality of social commerce affiliate management modules 120 comprises a blog/site management module 218, a social network management module 222, and a mobile delivery management module 222. The plurality of social commerce affiliate management modules 120 likewise comprises a hosting management module 224, a social commerce management module 226, and a marketing management module 228.

In one embodiment, the blog/site management module 214 is used by the plurality of affiliates 214 to manage the posting and linking of social commerce content from the affiliate's online blog or website to the social commerce marketplace system 118. In another embodiment, the social network management module 220 is used by the plurality of affiliates 214 to manage the linkages between one or more social media environments and the social commerce marketplace system 118. In yet another embodiment, the mobile delivery management module 222 is used by the plurality of affiliates 214 to manage the delivery of social commerce content to a mobile device. In still another embodiment, the hosting management module 224 is used by the plurality of affiliates 214 to manage the hosting environment(s) of a customized social commerce storefront associated with the affiliate and the merchant. In one embodiment, the social commerce management module 226 is used by the plurality of affiliates 214 to perform social commerce management operations as described in greater detail herein. In yet another embodiment, the marketing management module 228 is used by the plurality of affiliates 214 to perform social commerce marketing operations, as likewise described in greater detail herein.

In various embodiments, the plurality of merchant/network management modules 122 are accessed and used by a plurality of merchant administrators 230. In these and other embodiments, the plurality of merchant/network management modules 122 comprises a merchant/network management module 234, and a social commerce moderation module 236. Likewise, the plurality of merchant/network management modules 122 comprises a social commerce reporting module 238, a targeting module 240, and an incentives module 242.

In one embodiment, the merchant/network management module is used by is used by the plurality of merchant administrators 230 to manage a plurality of affiliate social commerce storefronts and a plurality of affiliate networks 204. In another embodiment, the moderation management module 236 is used by the plurality of merchant administrators 230 to monitor and moderate social commerce content and associated social media content related to the plurality of affiliates 214. In yet another embodiment, the social commerce reporting module 238 is used by the plurality of merchant administrators 230 to administer and deliver a plurality of social commerce reports as described in greater detail herein. In one embodiment, the targeting module 240 is used by the plurality of merchant administrators 230 to perform targeted advertising and promotion operations familiar to those of skill in the art and described in greater detail herein. In another embodiment, the incentives module 242 is used by the plurality of merchant administrators 230 to manage the accounting and payment of incentives to the plurality of affiliates 214 as compensation for referring customers to the merchant. As described in greater detail herein, the plurality of social commerce affiliate management modules 120 and the plurality of merchant/network management modules 122 may include additional modules and the foregoing is not intended to limit the spirit, scope or intent of the invention.

Referring now to FIG. 2, a plurality of users, such as customers 202, are referred by a plurality of affiliate networks 204 to the social commerce marketplace system 118 as described in greater detail. Once referred, the customers 202 are presented with a customized social commerce storefront that is associated with an individual affiliate of the plurality of affiliates 214 and the merchant. In various embodiments, each of the customized social commerce storefronts comprises a micro catalog 208 of purchasable products, which is a subset of a master catalog 210 comprising a set of available products. In these and other embodiments, and as likewise described in greater detail herein, the customized social commerce storefronts comprise social commerce content related to the purchasable products. In these various embodiments, the customers 202 review the social commerce content and select individual purchasable products for purchase. Once selected, an online purchase transaction familiar to skilled practitioners of the art is completed with the merchant online cart/checkout system 124.

Figure 3:
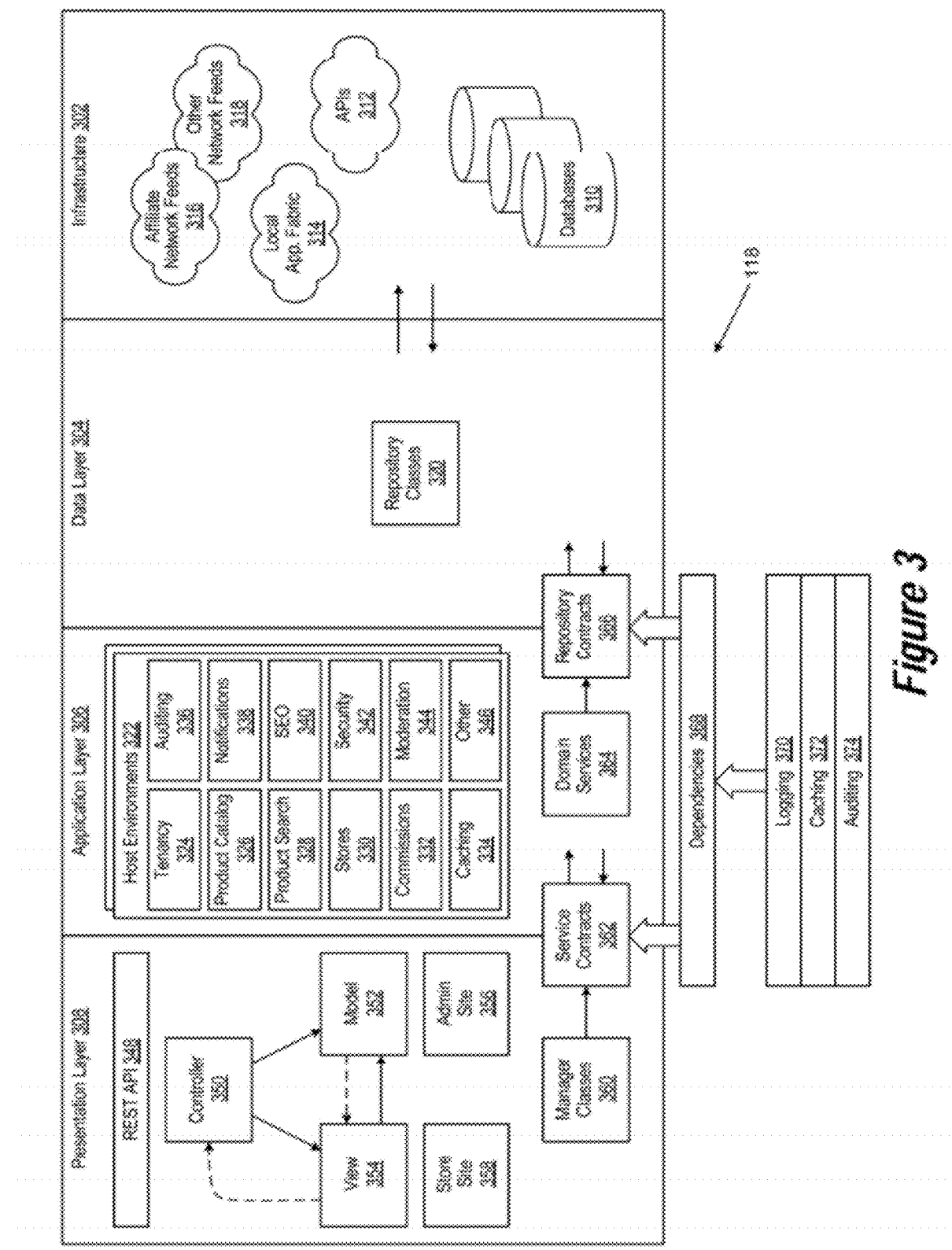
FIG. 3 is a simplified block diagram showing a high-level architecture of a social commerce marketplace system.

FIG. 3 is a simplified block diagram showing a high-level architecture of a social commerce marketplace system as implemented in accordance with an embodiment of the invention. In this embodiment, the architecture a social commerce marketplace system 118 comprises infrastructure 302, data 304, application 306 and presentation 308 layers. As shown in FIG. 3, the infrastructure 302 layer comprises feeds from affiliate networks 316, as described in greater detail herein, and other networks 318, such as advertising networks known to those of skill in the art. The infrastructure 302 layer likewise comprises a local application fabric 314, as likewise known to those of skill in the art, a plurality of application programming interfaces (APIs) 312, and a plurality of databases 310, as described in greater detail herein. The data 304 layer likewise comprises repository classes 320, which are used for the exchange of data between the data 304 and infrastructure 302 layers.

Likewise, the application 306 layer comprises host environments 322, which in turn comprise a tenancy management module 324, a product catalog management—module 326, and a product search module 328. The host environments 322 likewise comprise a stores management module 330, a commission management module 332, and a caching module 334. Likewise, the host environments 322 comprise an auditing module 336, a notifications module 338, a search engine optimization (SEO) module 340, a security management module 342, a moderation management module 344, and other modules 346 as described in greater detail herein.

In one embodiment, the tenancy management module 324 is used by merchant administrators to manage a plurality of affiliate tenancies in a virtual environment. In another embodiment, the product catalog management module 326 is used to manage available products in a master catalog and purchasable products, which are subsets of the available products, in micro catalogs as described in greater detail herein. In yet another embodiment, the product search module 328 is used with various other modules in the initiation, provisioning, and management of affiliate storefronts. In still another embodiment, the commission management module 332 is used to track, account, and pay commissions to affiliates as compensation for referring customers to the merchant. In one embodiment, the caching module 334 is used to cache social commerce content and other data related to conducting social commerce operations.

In another embodiment, the auditing module 336 is used to audit social commerce transactions that are performed within the social commerce marketplace system. In yet another embodiment, the notifications module 338 is use to manage notifications to affiliates as well as users referred by the affiliates to the social commerce marketplace system. In still another embodiment, the SEO module 340 is used to perform SEO operations known to skilled practitioners of the art. In this embodiment, the SEO operations, as described in greater detail herein, are performed to optimize the identification of a purchasable product according to the search terms used by either an affiliate or a user of a social media environment. In one embodiment, the security module is used to maintain the security of the social commerce marketplace system. In another embodiment, the moderation module 344 is used to monitor and moderate social commerce content and associated social media content related to a plurality of affiliates. In yet another embodiment, the other modules 346 comprise additional modules, as described in greater detail herein, that operate within the host environments 322.

In various embodiments, the presentation 308 layer comprises a Representational State Transfer (REST) application program interface (API) 348 known to skilled practitioners of the art. In these and other embodiments, the presentation 308 layer likewise comprises a controller module 350 a presentation model 352, a presentation view 354, and a plurality of administration 356 and affiliate storefront 358 sites. In these various embodiments, the controller module 350 interacts with the presentation model 354 and presentation view 354, which likewise interact with each other, to present different aspects of the plurality of administration 356 and affiliate storefront 358 sites. Likewise, the presentation view 354 module provides feedback to the controller module 350.

Referring now to FIG. 3, the presentation 308 layer comprises manager classes 350 and the application 306 layer comprises domain services. The manager classes 360 provide presentation layer data to the service contracts module 362, which is then used for the management of the domain service 364. In turn, the domain services 364 provide application layer data to the repository contracts module 366, where it is used for the management of the repository classes 320. Likewise, the service contracts module 362 and the repository contracts module 366 are managed and bounded by a dependencies module 368. In turn, the dependencies module 368 is managed with the logging 370, caching 372, and auditing 374 management modules.

Figure 4:
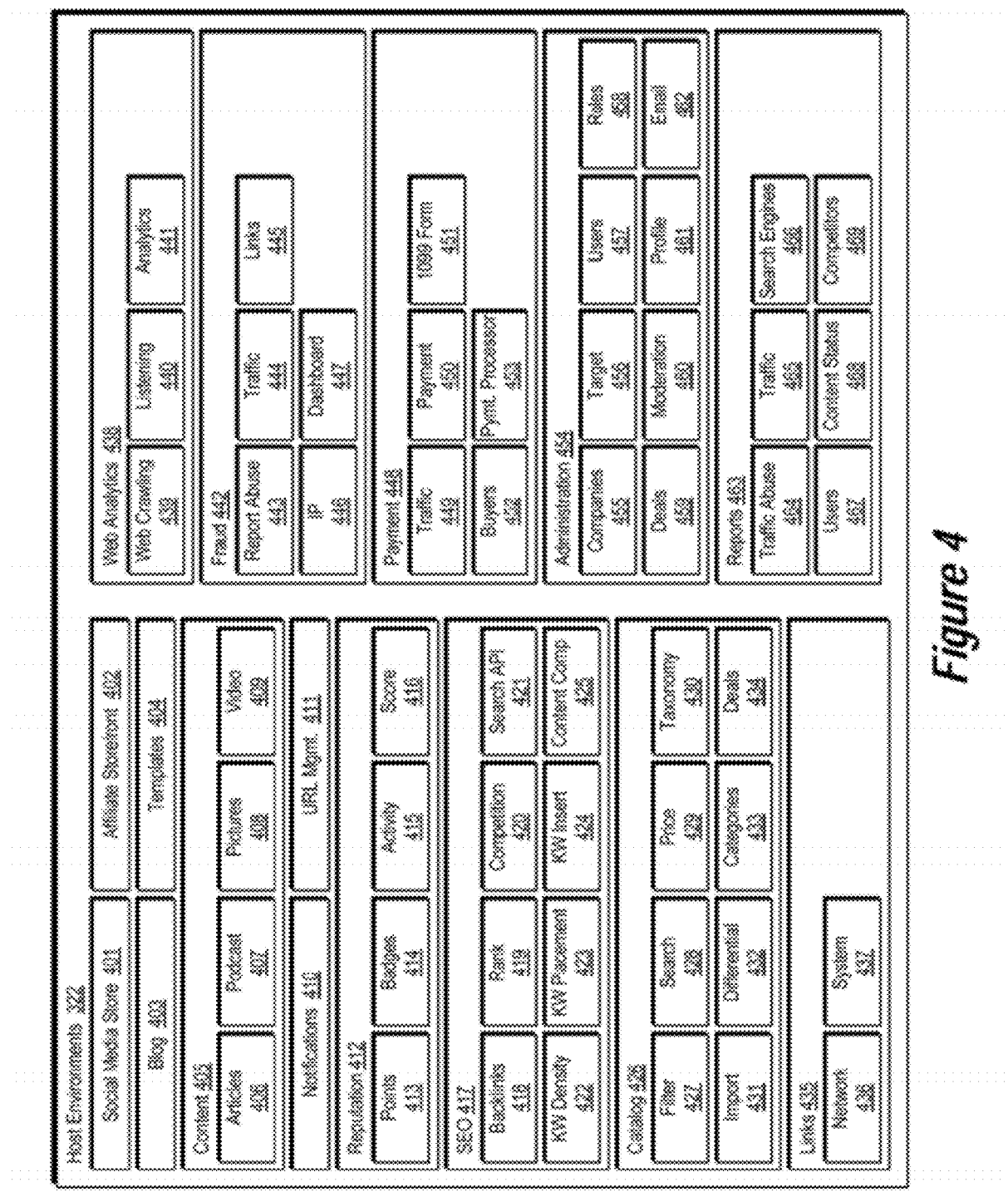
FIG. 4 is a simplified block diagram showing a plurality of social commerce modules implemented within a plurality of host environments.

FIG. 4 is a simplified block diagram showing a plurality of social commerce modules implemented within a plurality of host environments in accordance with an embodiment of the invention. In this embodiment, the host environments 322 comprise social media store 401, affiliate storefront 402, blog 403, templates 404, content 406, notifications 410, uniform resource locator (URL) 411, reputation 412, and search engine optimization (SEC)) 417 management modules. Likewise, the host environments 322 comprise catalog 426, links 435, web analytics 438, fraud 442, payment 448, administration 454, and reports 463 management modules.

In one embodiment, the social media store 401 management module is used to manage a social commerce storefront that is associated with an affiliate's presence and activities within a social media environment. In another embodiment, the affiliate storefront 402 management module is used to manage a social commerce storefront that is associated with an affiliate's web site or online blog. In yet another embodiment, the blog 403 management module is used to manage an affiliate's blog activities as it relates to social commerce activities, processes and operations as described in greater detail herein. In still another embodiment, as likewise described in greater detail herein, the templates 404 management module is used for the automated configuration of social commerce storefront pages. In one embodiment, the notifications 410 management module is used for the management of notifications to affiliates and users associated with affiliates, such as users of an affiliate's online social commerce presence. In various embodiments, the affiliate's online presence may comprise a blog, a website, or a community of interest or conversation thread in a social media environment. In another embodiment, the URL 411 management module is used to manage URL links between the host environments 322 and the affiliate's various online social commerce presences.

In yet another embodiment, the content 405 management module further comprises articles 406, podcast 407, pictures 408, and video 409 management sub-modules. In this and other embodiments, the articles 406, podcast 407, pictures 408, and video 409 management sub-modules are used by affiliates to manage their respective, associated content as it relates to social commerce operations. In still another embodiment, the reputation 412 management module comprises points 413, badges 414, activity 415, and score 416 management sub-modules. In this and other embodiments, the reputation 412 management module comprises points 413, badges 414, activity 415, and score 416 management sub-modules are used by the merchant to manage reputation data associated with affiliates. As used herein, reputation data refers to data associated with social commerce activities performed by an affiliate. As an example, an affiliate may receive points from a merchant for each item of social commerce content they product. Likewise, badges may be awarded upon achievement of various point tiers or frequency of activity. Likewise, each social commerce content item may receive a score that is associated with the achievement of the points and badges. It will be appreciated that many such examples are possible and the foregoing is not intended to limit the spirit, scope, or intent of the invention.

In one embodiment, the SEO management 417 module comprises backlinks 418, rank 419, competition 420, search application program interface (API) 421, keyword density 422, keyword placement 423, keyword insertion 424, and content comparison 425 management sub-modules. In this and other embodiments the various sub-modules of the SEO management 417 module are used by affiliates and the merchants to perform SEO operations familiar to those of skill in the art. As an example, the backlinks 418 management sub-module may be used to determine prior web site locations that a user has visited prior to being referred to an affiliate's social commerce storefront. Likewise, the rank 419 management sub-module may be used to determine the search engine rank assigned to the affiliate's social commerce storefront as well as the individual search engine ranking of the search terms that resulted in the referral. As another example, the competition 420 management sub-module may be used by the merchant to rank the search engine popularity of their competitors, or alternatively, the frequency that a competitor's web site is returned as a result of a search by a user of a social media environment. Likewise, the search API 421 management sub-module may be used by the merchant and affiliates alike to gain access to various search engines in order to receive search metadata. As yet another example, the keyword density 422, placement 423, and insertion 424 management sub-modules may likewise be used by the merchant and the affiliates to optimize searches through the use of predetermined keywords within related social commerce content. As still another example, the content comparison 425 sub-module may be used to compare various items of social commerce content to determine which items perform better than others during SEO operations.

In another embodiment, the catalog 426 management module comprises filter 427, search 428, price 429, taxonomy 430, import 431, differential 432, categories 433, and deals 434 management sub-modules. In this and other embodiments, the filter 427, search 428, price 429, taxonomy 430, import 431, differential 432, categories 433, and deals 434 management sub-modules are used by the affiliate for managing their social commerce storefronts. For example, the filter 427, search 428, price 429, differential 432, deals 434, and import 431 management sub-modules may be used individually, or in combination, to identify and populate a set of purchasable products within a micro catalog from a set of available products contained in a master catalog. Likewise, the taxonomy 430 and categories 433 management sub-modules may be used to understand the interrelationship of various purchasable products and how they are categorized within the affiliate's social commerce storefront. It will be appreciated that many such examples are possible and the foregoing is not intended to limit the spirit, scope, or intent of the invention.

In yet another embodiment, the links 435 management module comprises network 436 and system 437 management sub-modules, which are used to manage the linkages between the various systems, modules, and sub-modules of the social commerce marketplace system and various affiliate and advertising networks. In still another embodiment, the web analytics 438 module comprises web crawling 439, listening 440, and analytics 441 management sub-modules. In this and other embodiments the web crawling 439, listening 440, and analytics 441 management sub-modules are used by the merchant to perform web analytics operations familiar to skilled practitioners of the art. As an example, the merchant may use the web crawling 439 management sub-module to perform web crawling operations to discover conversation threads associated with its products. Once discovered, the listening 440 management sub-module may be used to monitor the conversations threads, which are then analyzed with the analytics 441 management sub-module to determine their relevance and possible effect on social commerce operations. Those of skill in the art will be knowledgeable of many such examples. Accordingly, the foregoing is not intended to limit the spirit, scope, or intent of the invention.

In one embodiment, the fraud 442 management module comprises an abuse reporting 443, traffic 444, links 445, Internet Protocol (IP) 446, and dashboard 447 management sub-modules. In this and other embodiments, the abuse reporting 443, traffic 444, links 445, Internet Protocol (IP) 446, and dashboard 447 management sub-modules are used by the merchant to identify, mitigate, and prevent fraudulent behavior within the social commerce market place system. As an example, the traffic 444, links 445, and IP 446 management sub-modules may be used to identify the source of fraudulent behavior. Once identified, it may be reported by the abuse reporting 443 management sub-module and then displayed for review within a user interface by the dashboard 447 sub-module.

In another embodiment, the payment 448 module comprises a traffic 449, payment 450, 1099 Form 451, buyers 452, and payment processor 453, management sub-modules. In this and other embodiments, the traffic 449, payment 450, 1099 451, buyers 452, and payment processor 453, management sub-modules are used by the merchant for the management of payment to affiliates. As an example, the buyers 452 and traffic 449 management sub-modules may be used to identify individual buyers and the traffic they generate at an affiliate's social commerce storefront. In turn, the payment 450 and payment processor 453 sub-modules may be used to track the payments made by the buyers, which are then processed by various payment processors. Likewise, the same sub-modules may be used to track commission payments made by the merchant to individual affiliates. The output of those sub-modules may then be processed by the 1099 Form 451 sub-module for managing reporting of the commission payments to the affiliate to the Internal Revenue Service (RIS).

In yet another embodiment, the administration 454 module comprises companies 455, target 456, users 457, roles 458, deals 459, moderation 460, profile 461, and email 462 management sub-modules. In this embodiment, the companies 455, target 456, users 457, roles 458, deals 459, moderation 460, profile 461, and email 462 management sub-modules are used by the merchant to administer the various users of the social commerce marketplace system. As an example, the target 456 management sub-module may be used, individually or in conjunction with, the target 456, users 457, profile 461, and roles 458 management sub-modules to identify specific users of a social media environment. Once identified, their social media interactions may be monitored by the moderation 460 management sub-module, and in turn the email 462 and deals 459 management sub-modules may be used individually, or in combination, to target predetermined users.

In still another embodiment, the reports module 463 comprises traffic abuse 463, traffic 465, search engines 466, users 467, content status 468, and competitors 469 reporting sub-modules. In this embodiment, the traffic abuse 463, traffic 465, search engines 466, users 467, content status 468, and competitors 469 reporting sub-modules are used by the merchant to generate various reports related to social commerce operations, which in turn may be provided to an affiliate. As an example, the content status 468 reporting sub-module may report on the status of various items of social commerce content and the search engines 466 reporting sub-module may report on the search results it generates. In turn, the traffic reporting 465 sub-module may be used to report on the social commerce traffic resulting from the search results and the users 467 reporting sub-module may provide reports related to the various users referred to the social commerce site. Likewise, the traffic abuse reporting sub-module 464 may be used to report on various traffic abuses related to the social commerce marketplace system, while the competitors 469 reporting sub-module may provide reports related to competitive activity from competitors. It will be appreciated that many such examples are possible and the foregoing is not intended to limit the spirit, scope or intent of the invention.

Figure 5:
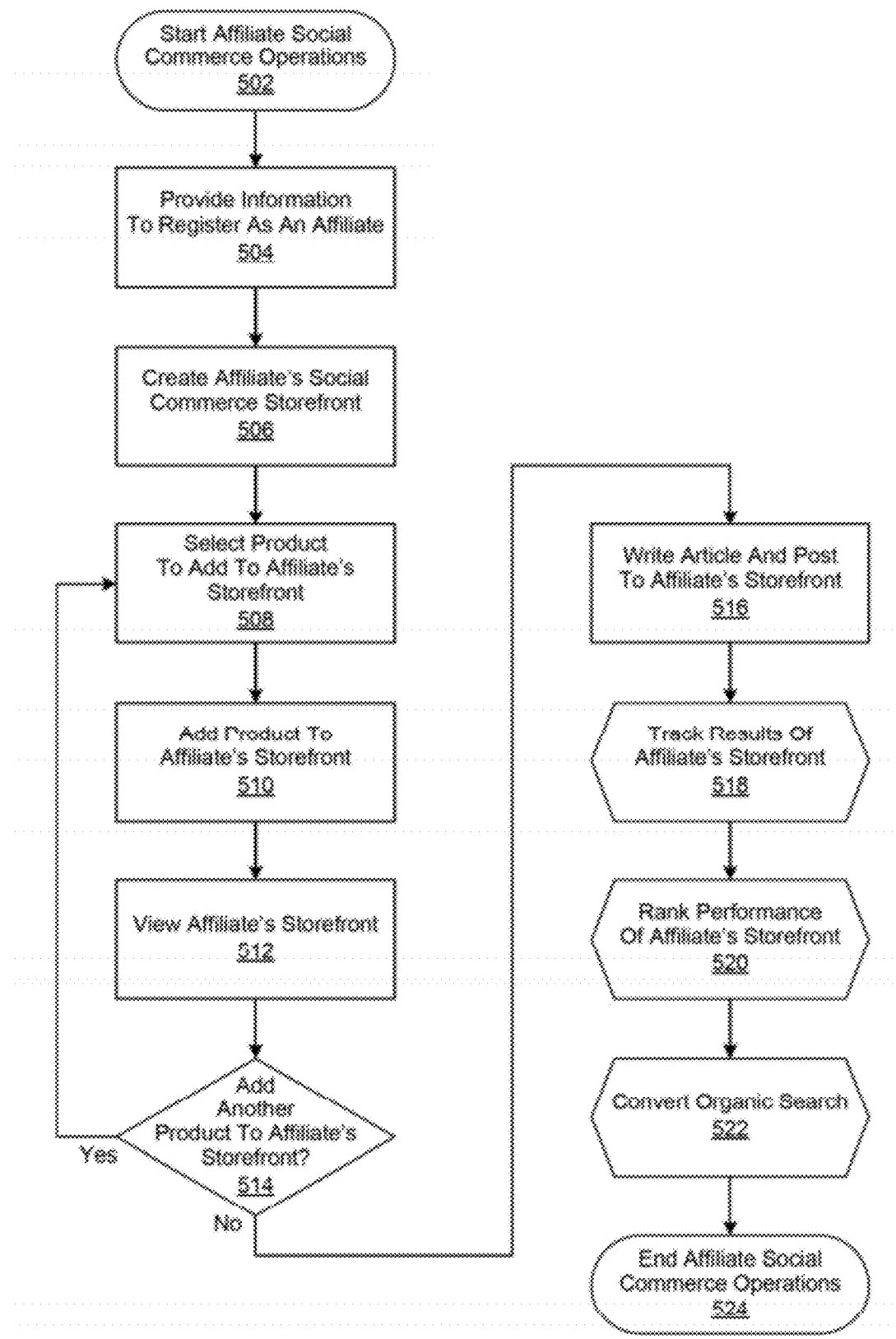
FIG. 5 is a generalized flow chart of social commerce initiation operations performed on behalf of an affiliate.

FIG. 5 is a generalized flow chart of social commerce initiation operations performed on behalf of an affiliate in accordance with an embodiment of the invention. In this embodiment, affiliate social commerce operations are begun in step 502, followed by a candidate affiliate providing information to a merchant in step 504 to register as an affiliate. The merchant then uses the provided information to create a social commerce storefront for the affiliate in step 506. The affiliate then proceeds to select a product to add to their social commerce storefront in step 508. In various embodiments, the product is selected from a plurality of available products contained in a master catalog. The selected product is then added to the affiliate's social commerce storefront in step 510. In various embodiments, a selected product becomes a purchasable product once it is added to the affiliate's social commerce storefront.

The affiliate then views their social commerce storefront in step 512, followed by a determination being made in step 514 whether to add an additional product. If so, then the process is continued, proceeding with step 508. Otherwise, an article related to one or more of the purchasable products is written in step 516 and then posted to the affiliate's social commerce storefront. The ongoing sales results of the affiliate's social commerce storefront is then tracked in step 518, as well as the ongoing ranking of its performance relative to other affiliate social commerce storefronts in step 520. Ongoing conversion of organic searches resulting in sale is likewise tracked in step 522, followed by affiliate social commerce initiation operations being ended in step 524.

Figure 6A:
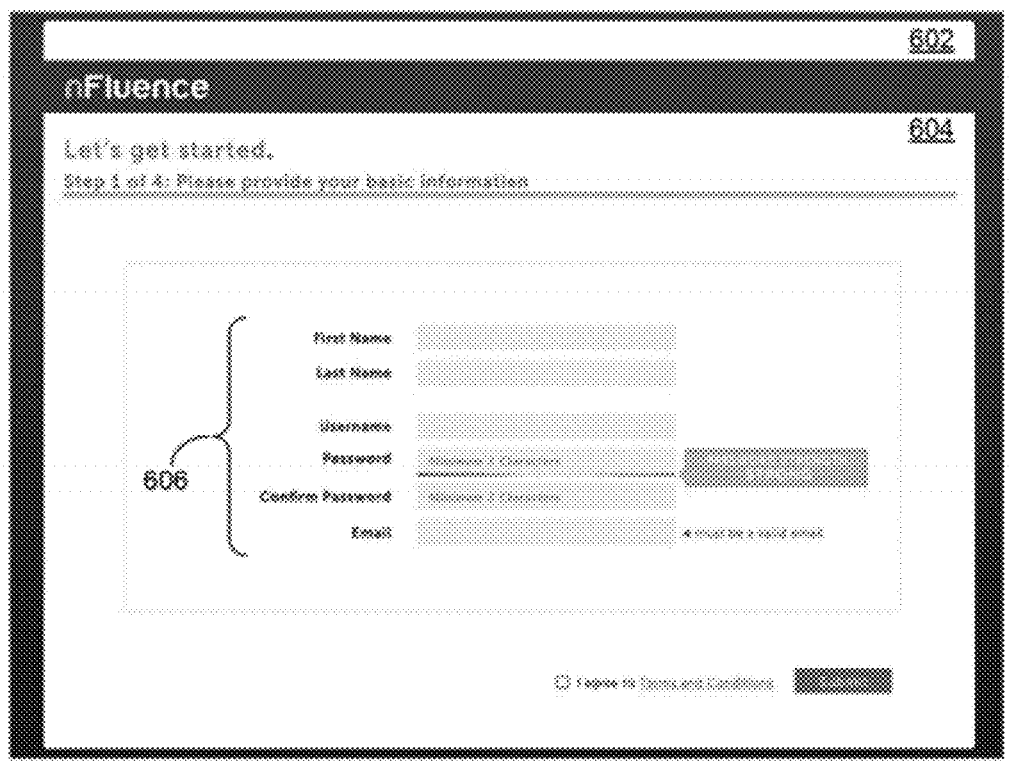
FIGS. 6a-d are generalized depictions of social commerce initiation operations performed on behalf of an affiliate within a plurality of user interface windows.
Figure 6B:
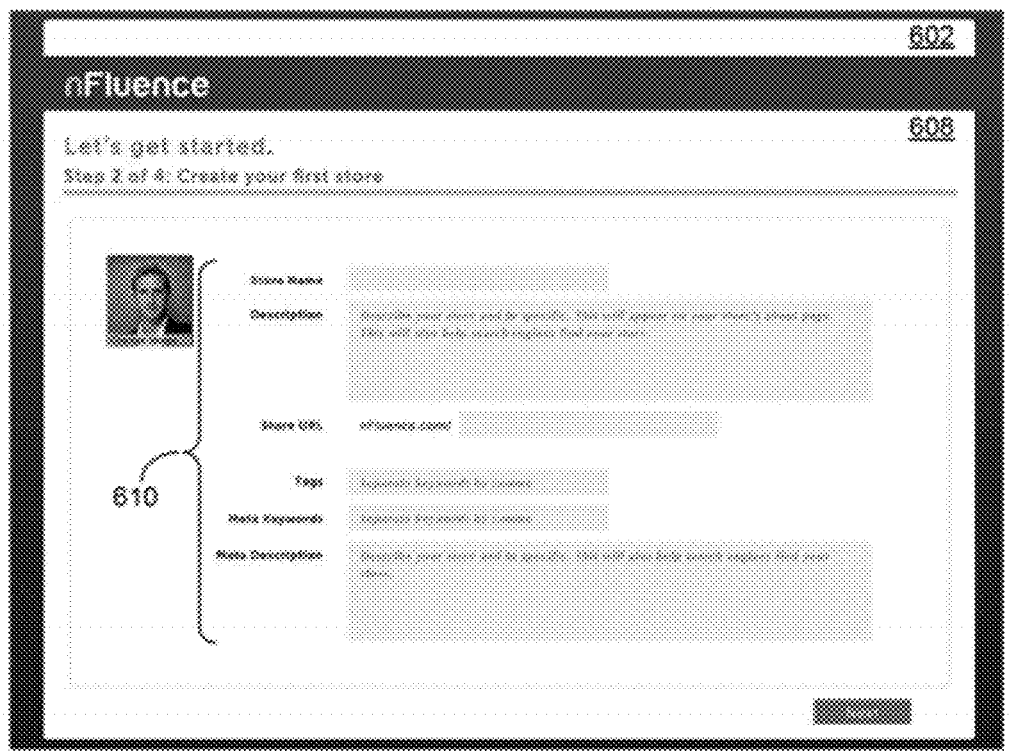
Figure 6C:
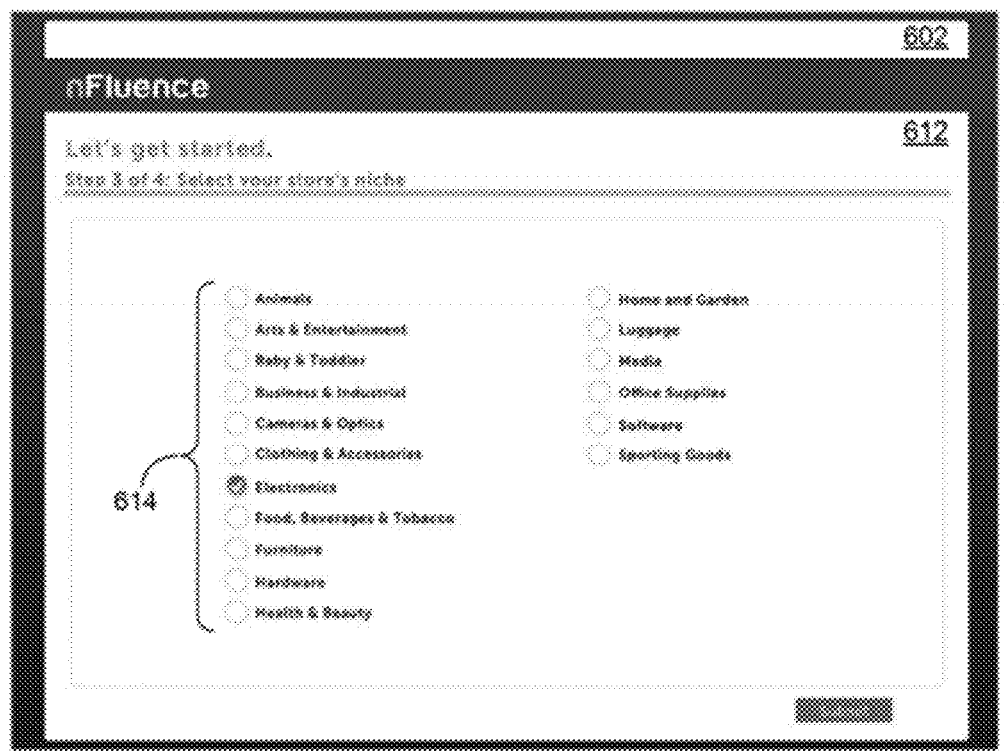
Figure 6D:
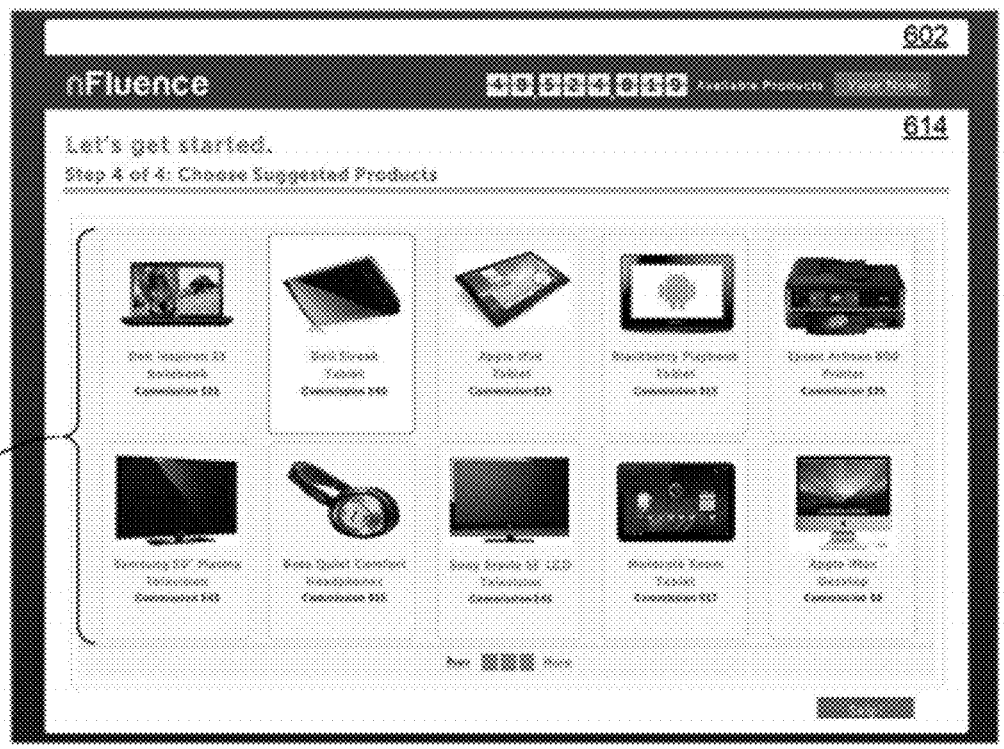

FIGS. 6a-d are generalized depictions of social commerce initiation operations performed on behalf of an affiliate within a plurality of user interface windows in accordance with an embodiment of the invention. In this embodiment, a social commerce storefront management module, as described in greater detail herein, is implemented within a window 604 of a user interface (UI) 602. As shown in FIG. 6a, the UI window 604 comprises data entry fields 606 for a candidate affiliate to provide information to initiate the creation of a social commerce storefront. Referring now to FIG. 6b, the affiliate then provides additional information 610 associated with their social commerce storefront. As shown in FIG. 6c, the affiliate selects the category 614 of their social commerce storefront, and as likewise shown in FIG. 6d, selects products 614 to be displayed for purchase within their social commerce storefront.

Figure 7:
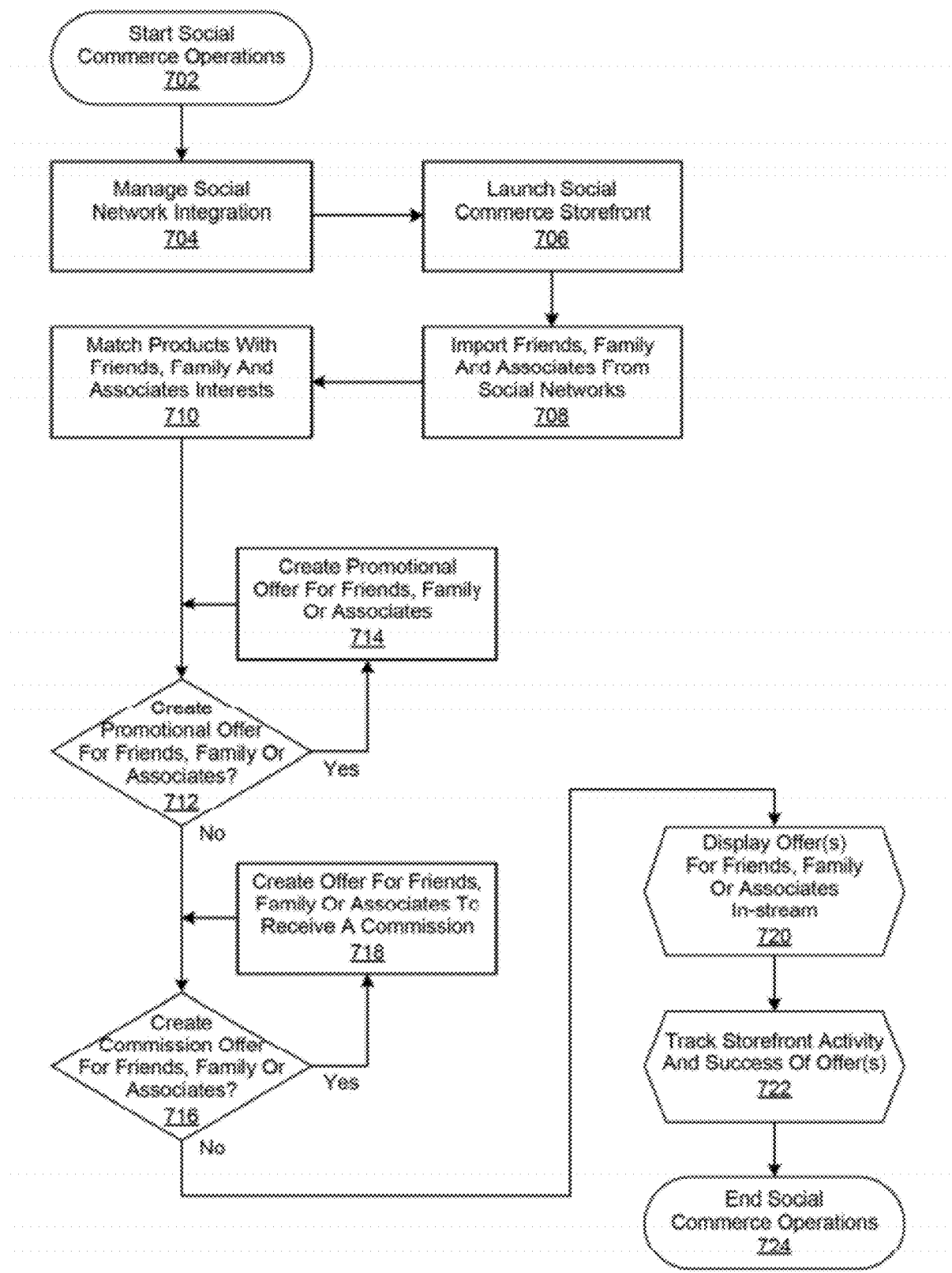
FIG. 7 is a generalized flow chart of the performance of social commerce operations.

FIG. 7 is a generalized flow chart of the performance of social commerce operations as implemented in accordance with an embodiment of the invention. In this embodiment, social commerce operations are begun in step 702, followed by the affiliate managing the integration of the social commerce storefront in step 704 with a social media environment, such as a social network. In various embodiments, the integration may be with an affiliate web site or blog. The affiliate then launches the social commerce storefront in step 706, followed by the importation of friends, family, and associates from one or more social media environments (e.g., a social network) in step 708. The friends, family and associates are then matched with products that are appropriate to their interests in step 710, followed by a determination in step 712 whether to create a promotional offer for them. If so, then a promotional offer is created in step 714 and the process is continued, proceeding with step 712. Otherwise, a determination is made in step 716 whether the affiliate will offer to provide an offer to pay a commission to the friends, family or associates in return for referrals. If so, then a commission offer is prepared in step 718 and the process is continued, proceeding with step 716. Otherwise the promotion offers(s), the commission offer(s), or both, are displayed to the friends, family and associates in-line within the social media environment in step 720. Ongoing activity at the affiliate's social commerce storefront, and the corresponding success of the offer(s), is tracked in step 722 and social commerce operations are then ended in step 724.

Figure 8:
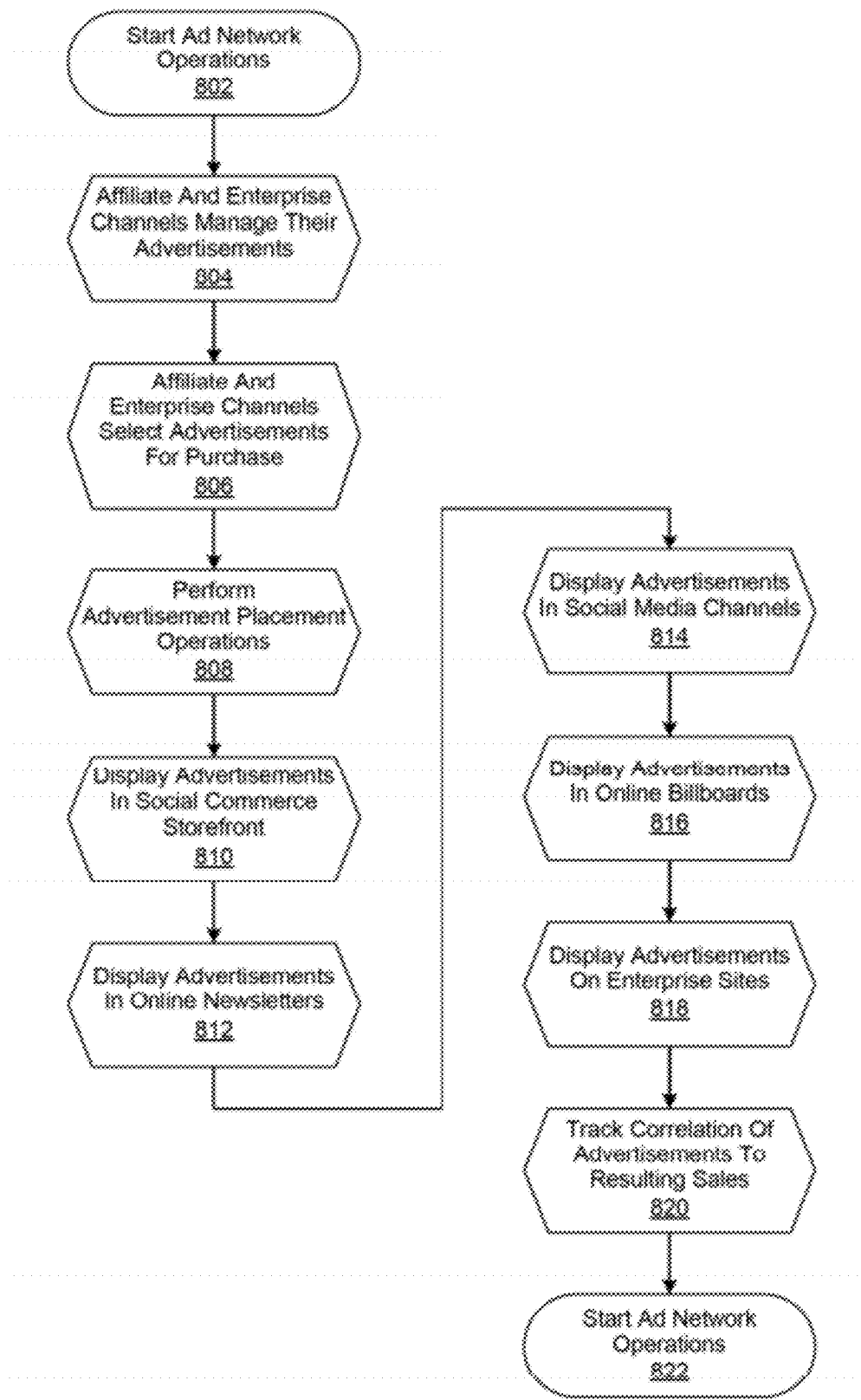
FIG. 8 is a generalized flow chart of the performance of social commerce advertising network management operations.

FIG. 8 is a generalized flow chart of the performance of social commerce advertising network management operations as implemented in accordance with an embodiment of the invention. In this embodiment, advertising network operations are begun in step 802, followed by ongoing operations in step 804 for affiliate and enterprise channels to manage their online advertisements. In step 806 the affiliate and enterprise channels perform ongoing operations to select online advertisements for purchase, followed by corresponding ongoing operations in step 808 to place the purchased online advertisements in predetermined online locations. In steps 810, 812, 814, 816, and 818, the affiliate and enterprise channels perform ongoing operations respectively display the online advertisements in social commerce storefronts, online newsletters, social media channels, online billboards, and enterprise sites. Ongoing operations are then performed in step 820 to correlate sales to the placement of the online advertisements, followed by advertising network operations being ended in step 822.

Figure 9A:
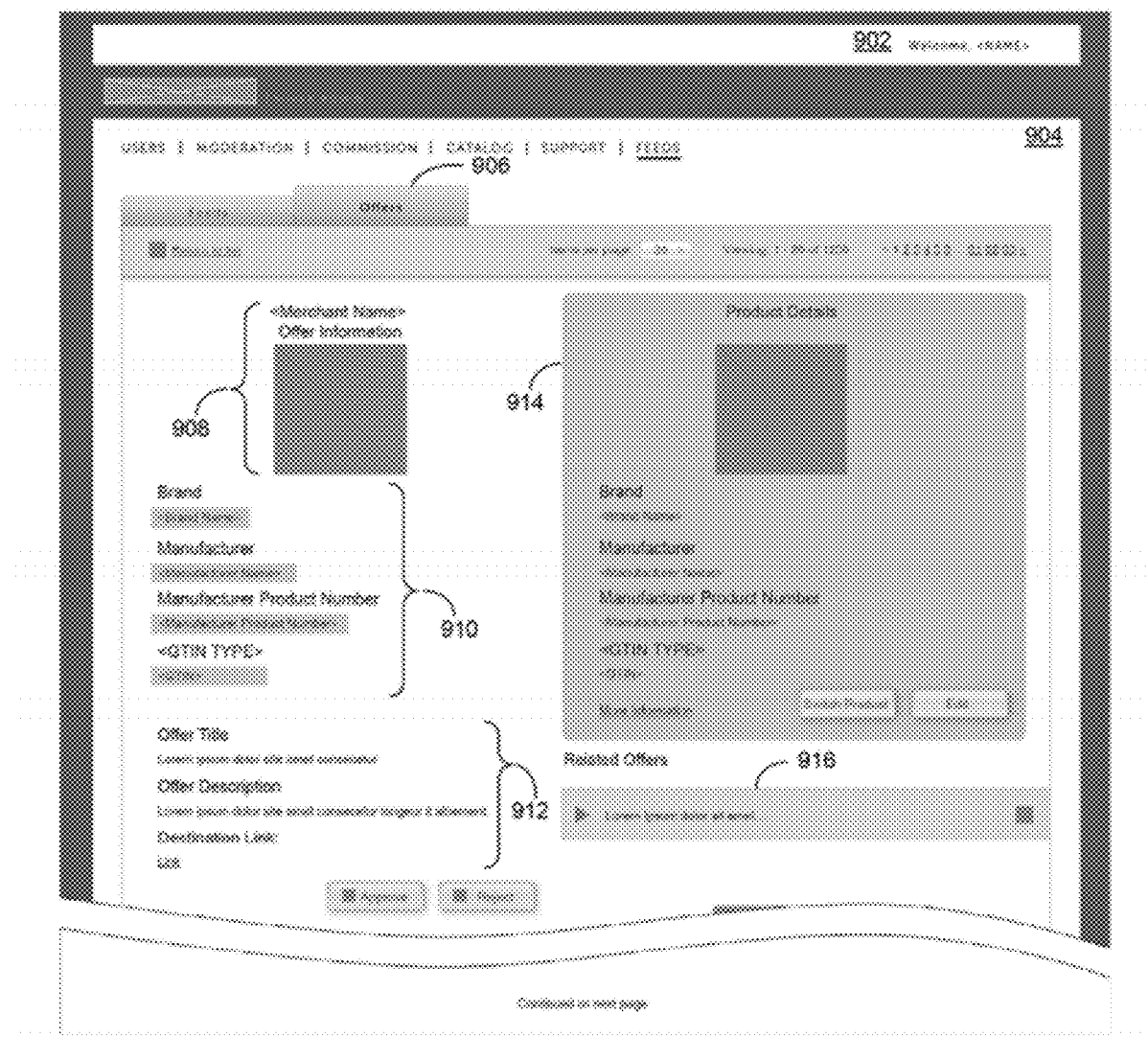
FIGS. 9a-b show the creation of an affiliate offer within a user interface window.
Figure 9B:
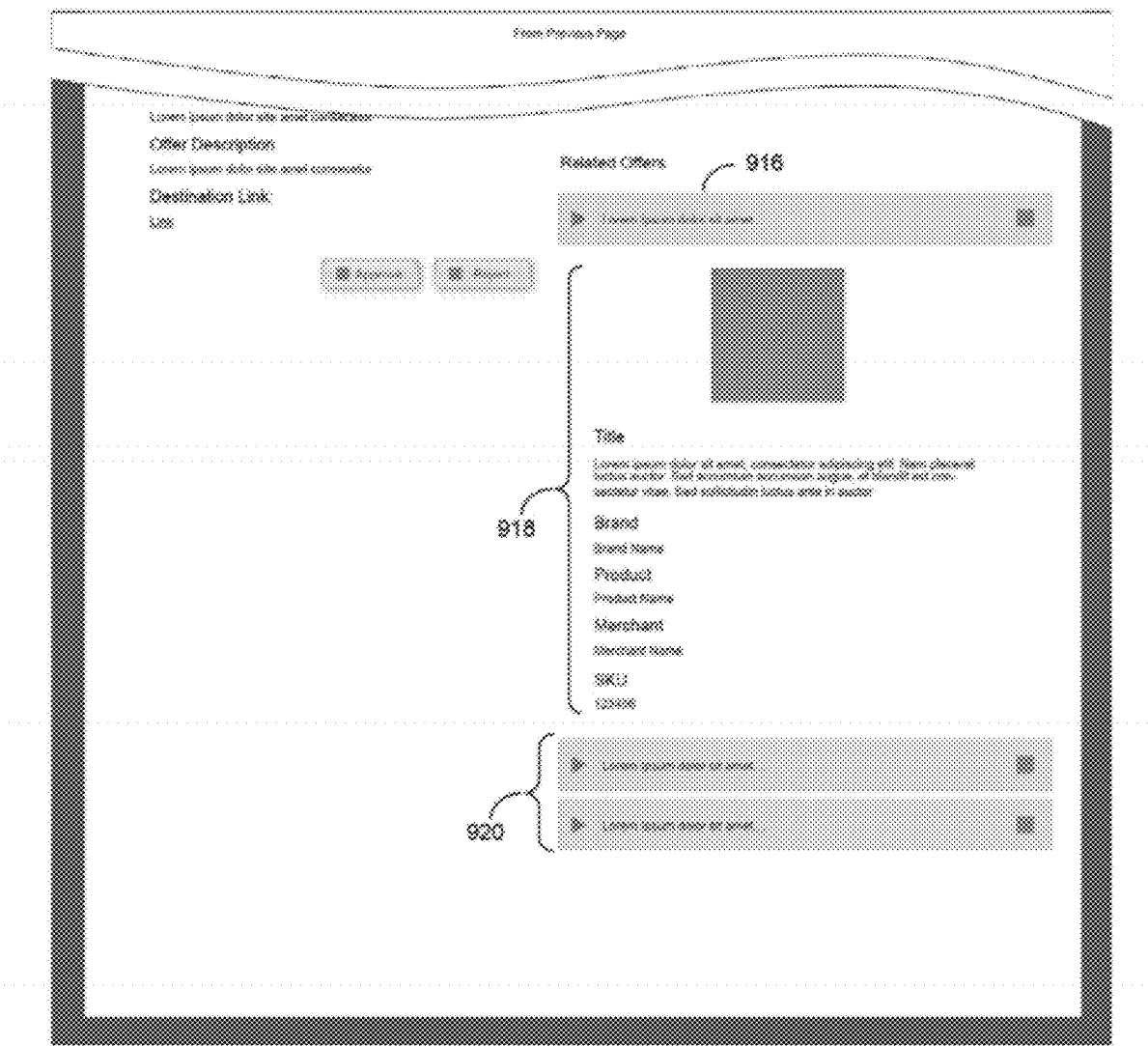

FIGS. 9a-b show the creation of an affiliate offer within a user interface window in accordance with an embodiment of the invention. In this embodiment, a social commerce storefront deals management module, as described in greater detail herein, is implemented within a window 904 of a user interface (UI) 902. As shown in FIG. 9a, the UI window 904 comprises an 'Offers' tab 906, a data entry field 908 for information related to the merchant and the affiliate making the offer, and associated data entry fields 910 corresponding to details of the purchasable product. Likewise, the UI window 904 comprises data entry fields 912 corresponding to details of the offer, as well as an offer display window 914 that provides a preview of the offer as it will appear when presented within a social media environment. As likewise shown in FIG. 9a, data display field 916 displays summary information corresponding to a related offer, and as shown in FIG. 9b, a corresponding offer display window 918 providing a preview of the related offer, as well as data display fields 920 displaying summary information corresponding to other offers.

Figure 10:
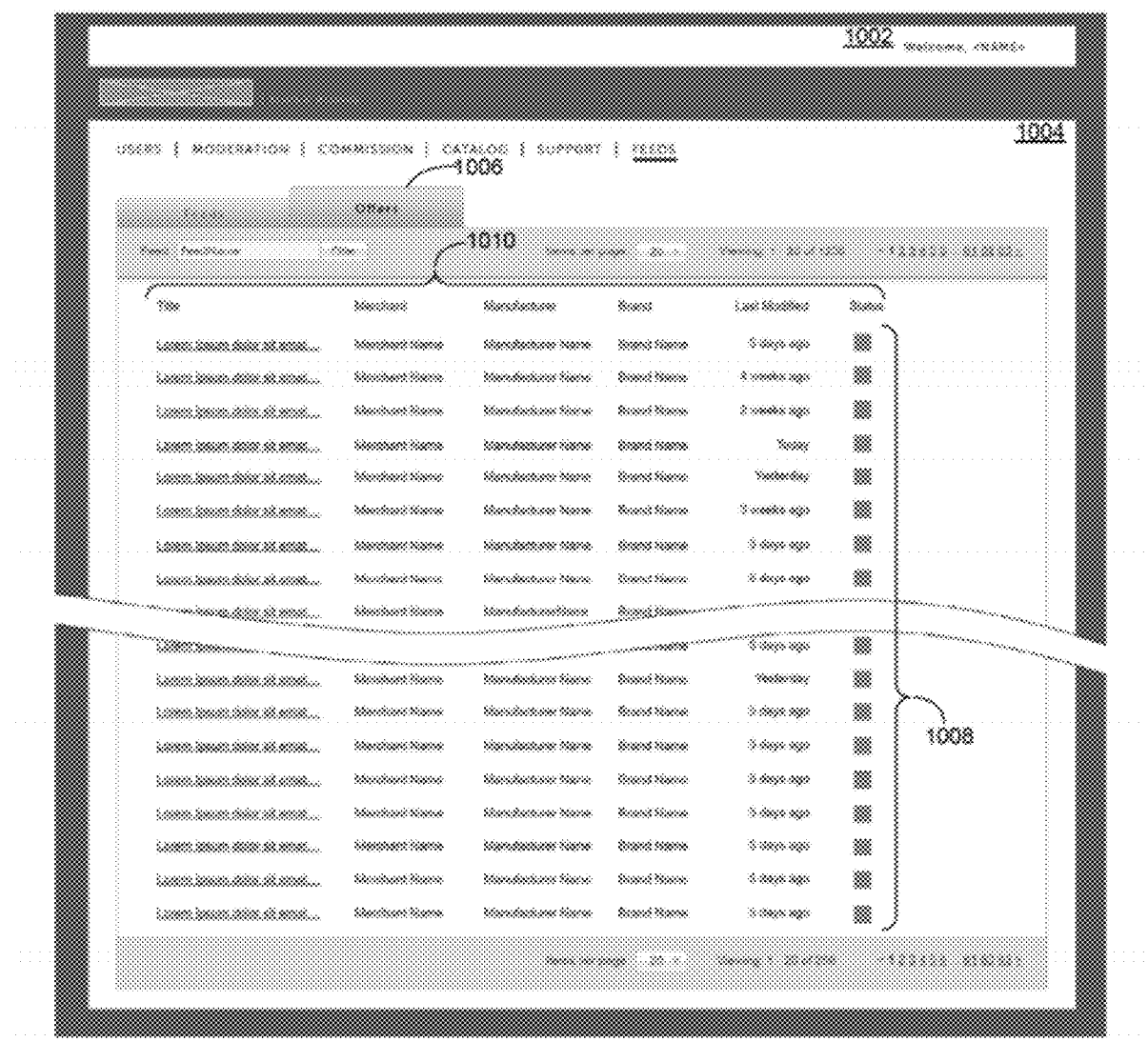
FIG. 10 shows the display of affiliate offers within a user interface window.

FIG. 10 shows the display of affiliate offers within a user interface window implemented in accordance with an embodiment of the invention. In this embodiment, a social commerce storefront deals management module, as described in greater detail herein, is implemented within a window 1004 of a user interface (UI) 1002. As shown in FIG. 10, the UI window 1004 comprises an 'Offers' tab 1006, as well a listing 1008 of a plurality of offers and related information 1010.

Figure 11:
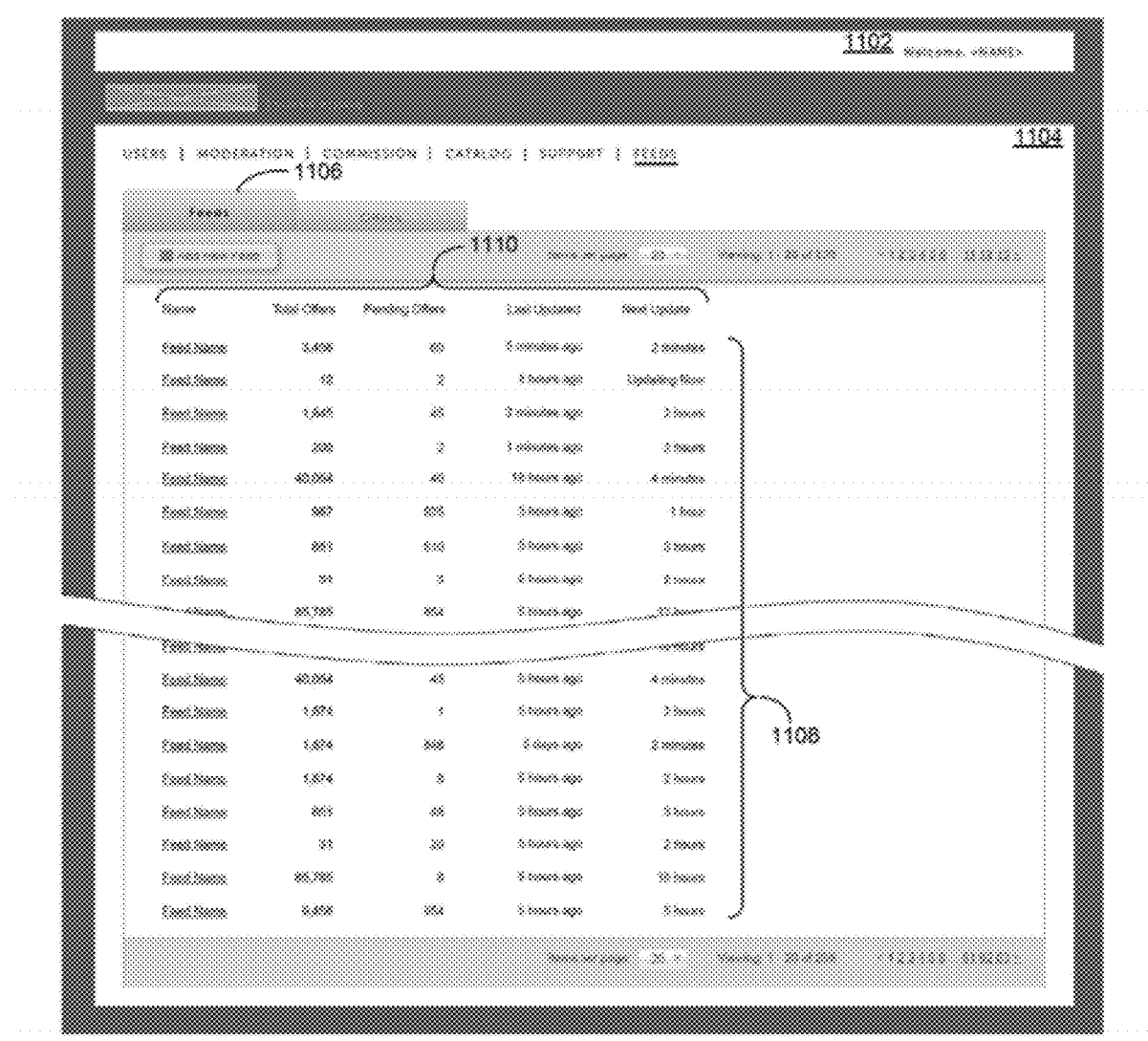
FIG. 11 shows the display of affiliate network feeds and associated offers within a user interface window.
Figure 11A:
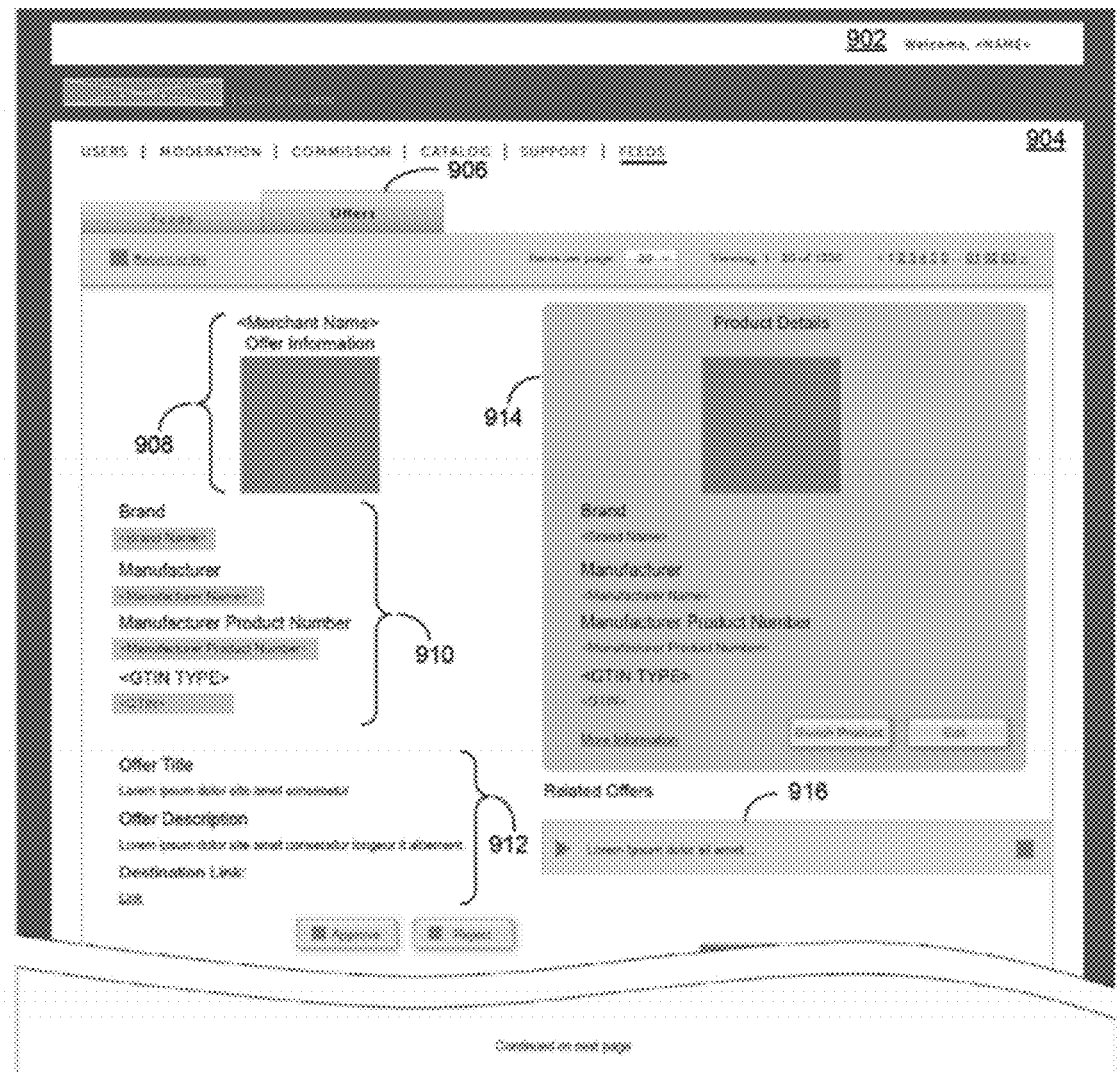
Figure 11B:
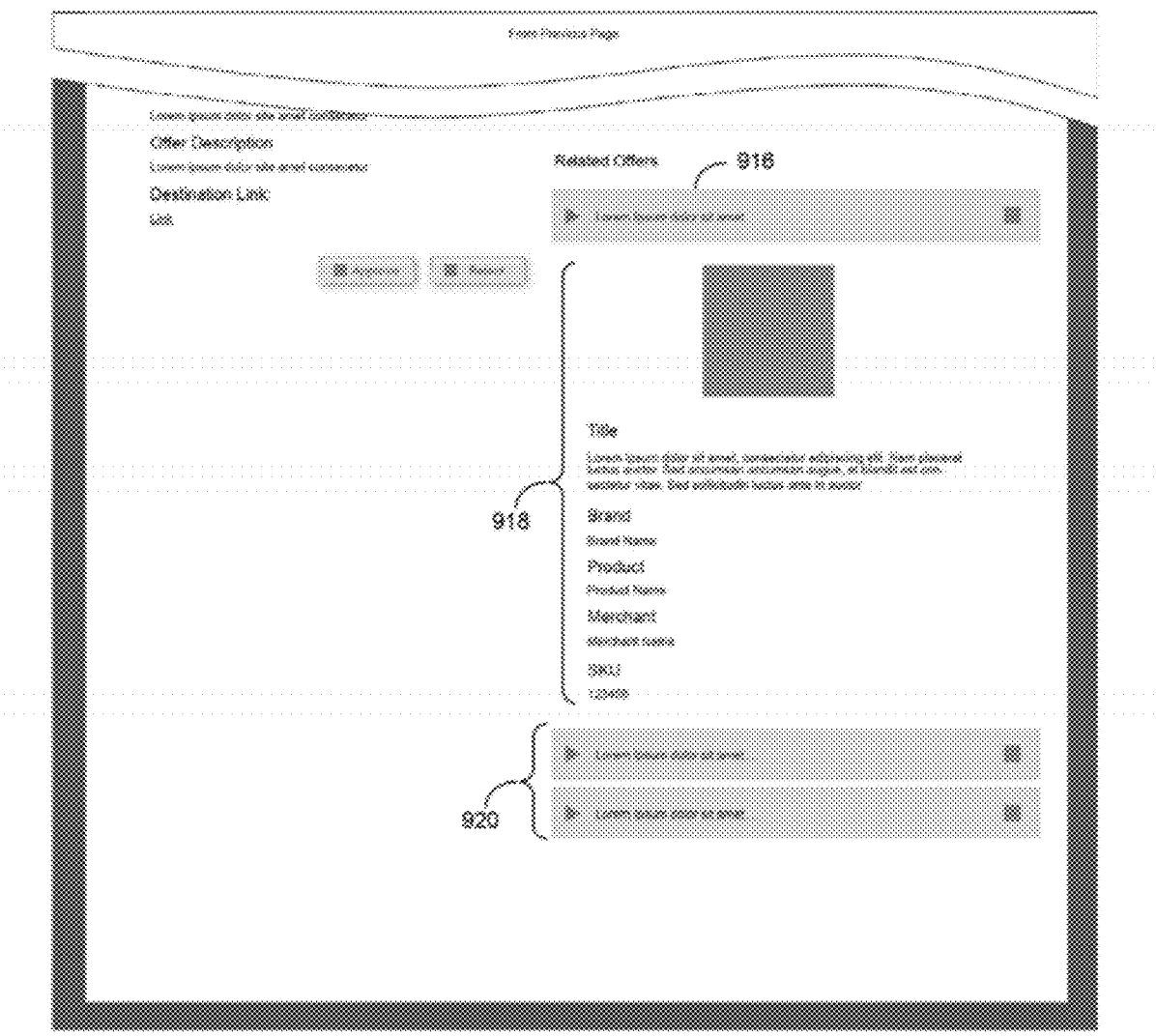

FIG. 11 shows the display of affiliate network feeds and associated offers within a user interface window implemented in accordance with an embodiment of the invention. In this embodiment, a social commerce storefront deals management module, as described in greater detail herein, is implemented within a window 1104 of a user interface (UI) 1102. As shown in FIG. 11, the UI window 1104 comprises an 'Offers' tab 906, as well a listing 1108 of a plurality of advertising network feeds corresponding to referrals resulting from associated offers, and related information 1110.

Figure 12:
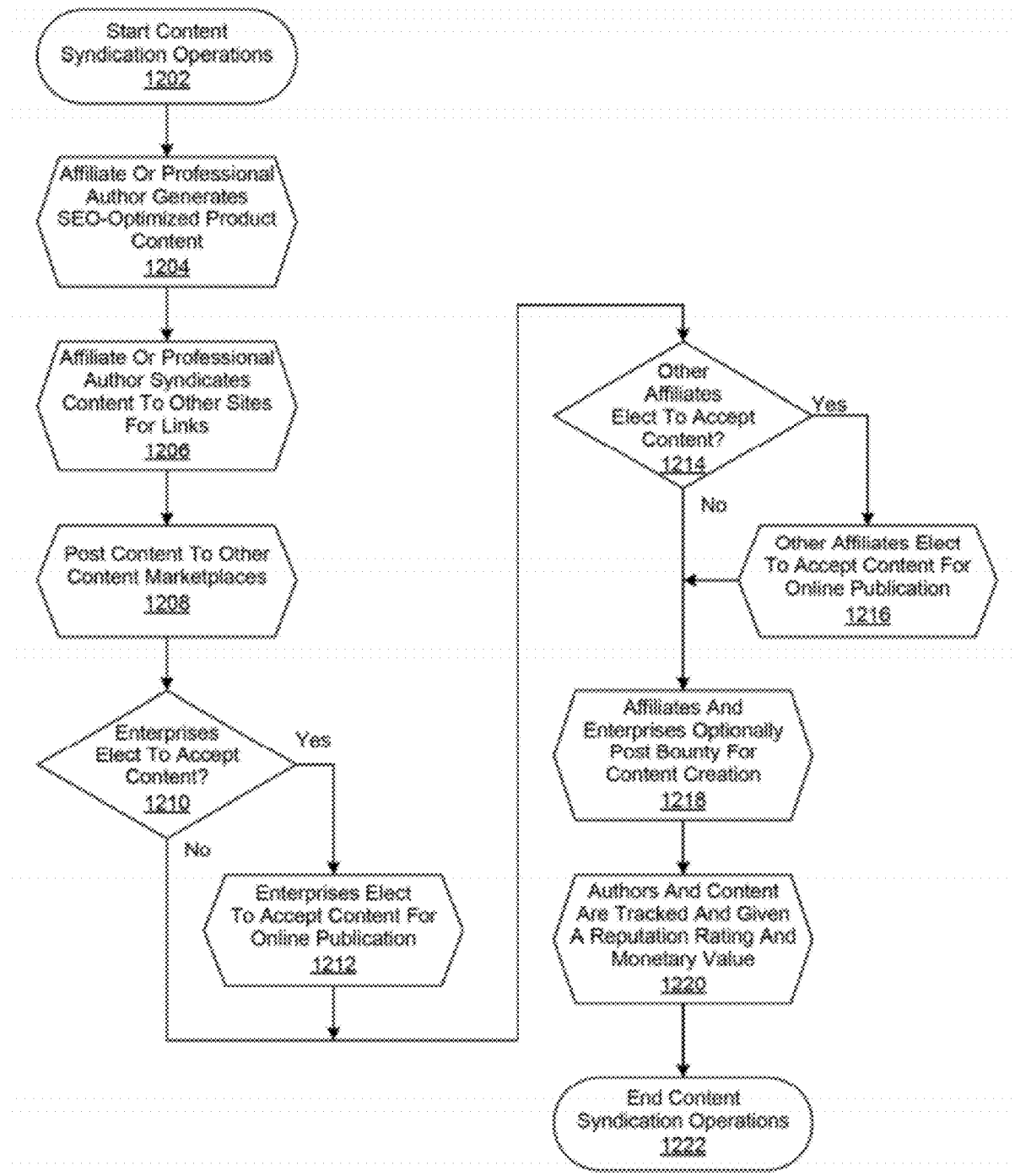
FIG. 12 is a generalized flow chart of the performance of content syndication operations.

FIG. 12 is a generalized flow chart of the performance of content syndication operations as implemented in accordance with an embodiment of the invention. In this embodiment, content syndication operations are begun in step 1202, followed by the ongoing generation of search engine optimization (SEO) content by an affiliate, a professional author, or both, in step 1204. Ongoing syndication operations are then performed in step 1206 to syndicate the SEO content other sites and establish corresponding links. Then, in step 1208, ongoing operations are performed to post the SEO content to other content marketplaces known to skilled practitioners of the art. A determination is then made in step 1210 whether enterprises (e.g., corporations) elect to accept the SEO content. If so, then ongoing operations are performed by the enterprises in step 1212 to accept the SEO content for online publication. As an example, a corporation may elect to post predetermined SEO content on their internal web site for review by employees.

However, if it is determined in step 1210 that enterprises do not elect to accept the SEO content, or if they do so in step 1212, then a determination is made in step 1214 whether other affiliates elect to accept the SEO content for online publication. If so, then ongoing operations are performed by affiliates in step 1216 to accept the SEO content for publication in step 1217. For example, another affiliate may elect to publish SEO content that is complementary to content they generate themselves. However, if it is determined in step 1214 that other affiliates do not elect to accept the SEO content, or if they do so in step 1216, then ongoing operations are performed in step 1218 for enterprises, affiliates, or both, to post a "bounty" (i.e., an offer for compensation) for content creation. Thereafter, ongoing operation are performed in step 1220 to track authors, the content they generate, their corresponding reputation ratings, and the monetary value they receive as compensation for providing the content. Content syndication operations are then ended in step 1222.

Figure 13:
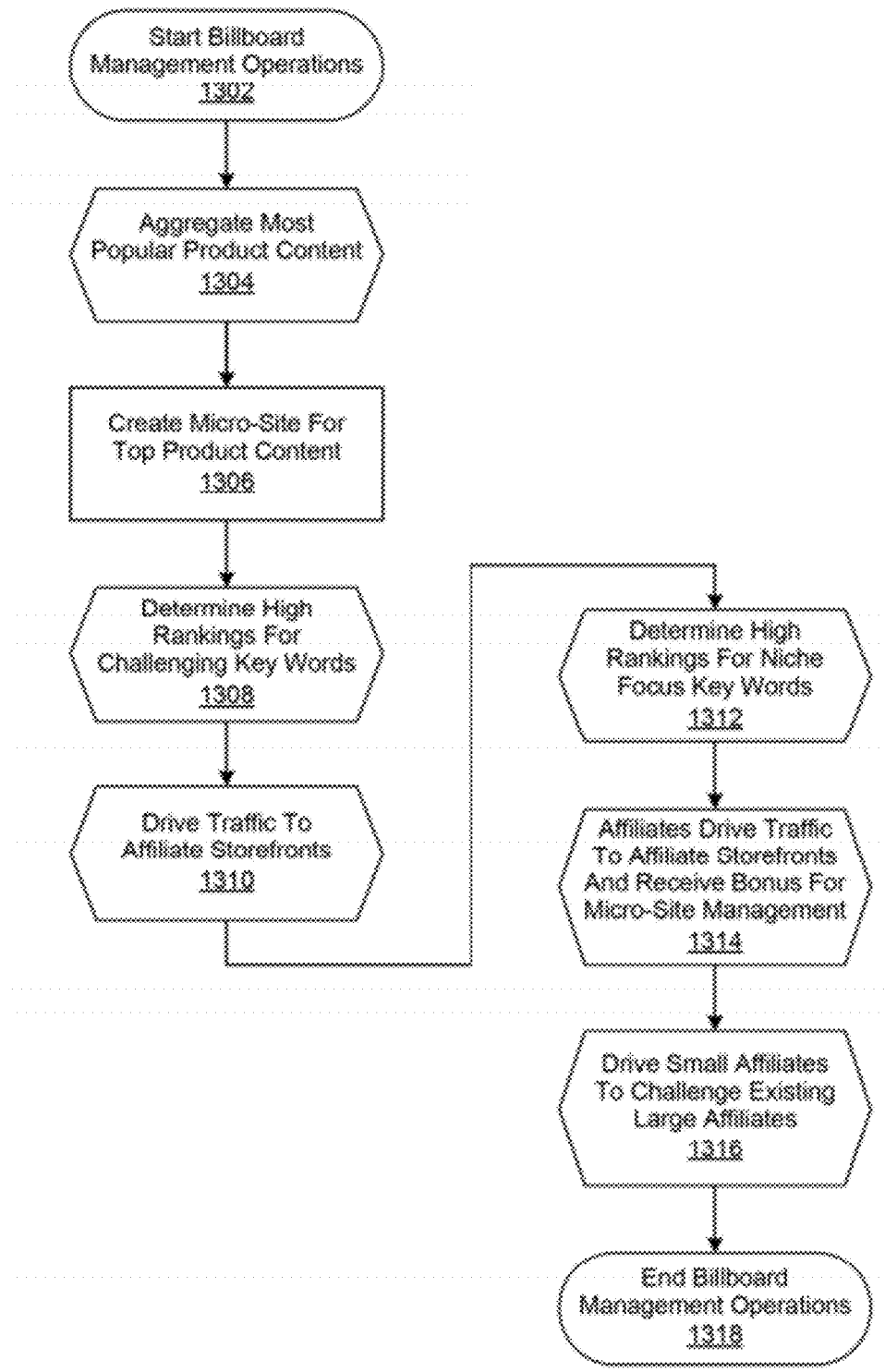
FIG. 13 is a generalized flow chart of the performance of billboard management operations.

FIG. 13 is a generalized flow chart of the performance of billboard management operations as implemented in accordance with an embodiment of the invention. In this embodiment, online billboard management operations familiar to those of skill in the art are begun in step 1320, followed by the ongoing aggregation of the most popular product content in step 1304. A micro site, such as a small, specialized web site, is then created in step 1306, followed by ongoing operations in step 1309 to determine high rankings for challenging key word used in searches for product information. Ongoing operations are then performed in step 1310 to drive traffic to affiliate social commerce storefronts, such as using the high ranking challenging key words in search engine optimization (SEO) operations known to skilled practitioners of the art. Thereafter, ongoing operations are performed in step 1312 to determine high ranking niche focus key words, followed by ongoing operations being performed by affiliates in step 1314 to drive traffic to their storefronts, and accordingly, receive compensation from a merchant for doing so. In step 1316, ongoing operations are performed by the merchant to challenge small affiliates to challenge the sales performance of larger affiliates. Online billboard management operations are then ended in step 1318.

Figure 14:
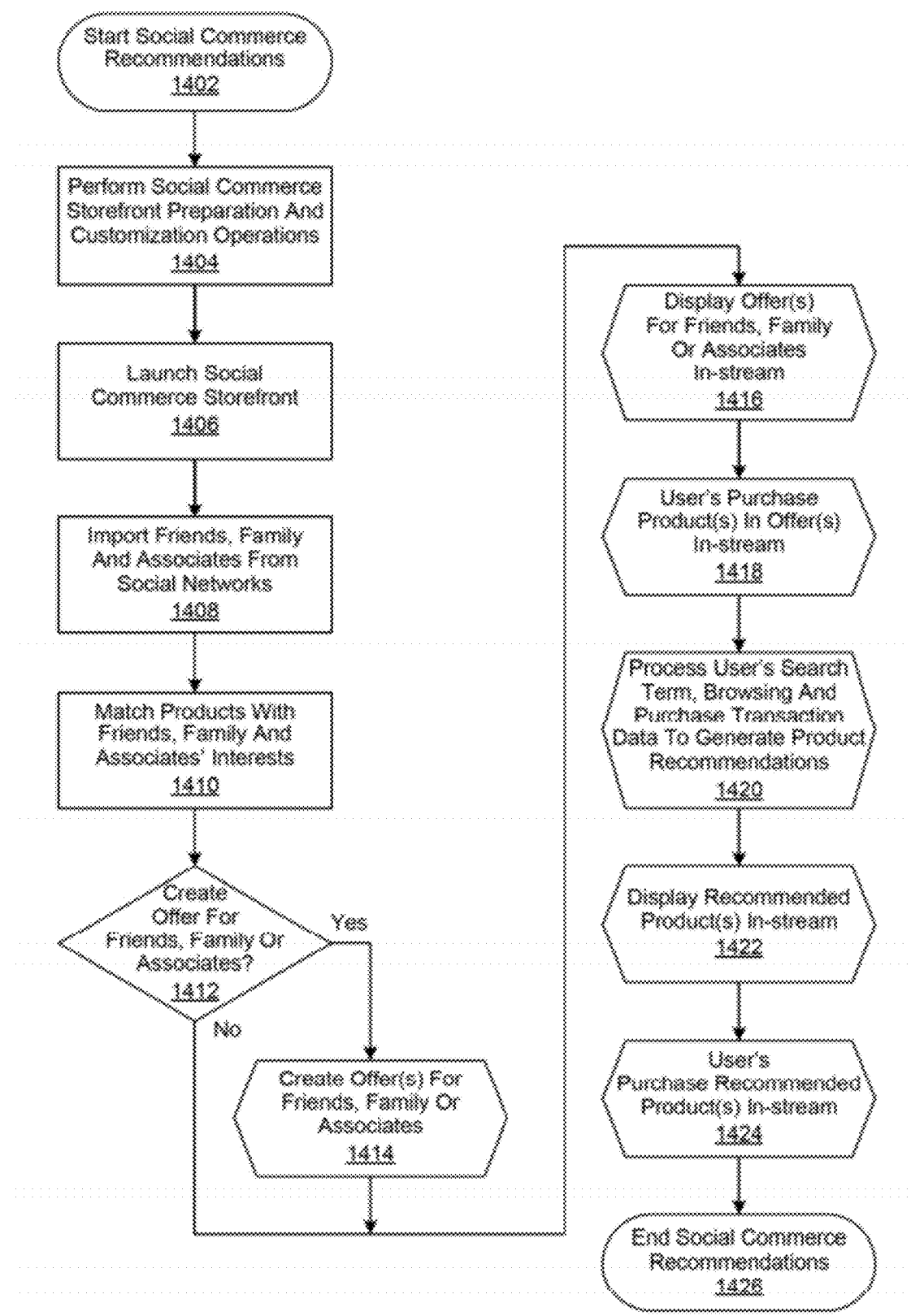
FIG. 14 is a generalized flow chart of the performance of social commerce recommendation operations.

FIG. 14 is a generalized flow chart of the performance of social commerce recommendation operations as implemented in accordance with an embodiment of the invention. In this embodiment, social commerce recommendation operations are begun in step 1402, followed by the performance of social commerce storefront preparation and customization operations in step 1404 as described in greater detail herein. Then, in step 1406, the affiliate's social commerce storefront is launched, followed by the importation in step 1408 of the affiliate's friends, family and associates from one or more social media environments, such as a social network. The products within the affiliate's social commerce storefront are then matched in step 1410 to the respective interests of the affiliate's friends, family and associates.

A determination is then made in step 1412 whether to create an offer for the affiliate's friends, family or associates. If so, then ongoing operations are performed in step 1414 to create the offer. In various embodiments, the offer is created for an individual, a subset, or a grouping of the friends, family and associates. In one embodiment, the offer is created according to search terms used by individual social media users within the friends, family or associates. In another embodiment, the offer is created according to prior purchases made by individual social media users within the friends, family or associates. In yet another embodiment, the offer is created according to social commerce content that individual social media users within the friends, family or associates have accessed. In still another embodiment, the offer is created according to social commerce data associated with the affiliate's social commerce storefront. In this and other embodiments, the social commerce data is provided to the affiliate by the merchant. Those of skill in the art will recognize that many such embodiments are possible and the foregoing is not intended to limit the spirit, scope or intent of the invention.

However, if it is decided not to create an offer in step 1412, or if the offer is created in step 1414, then ongoing operations are performed in step 1416 to display current and prior offers in-line within a social media environment to predetermined friends, family and associates. Ongoing operations are then performed in-line by users (e.g., friends, family and associates) of a social media environment to purchase products associated with the offers in step 1416. In step 1420, ongoing operations are performed to process the user's search term, browsing, purchase transaction, and other historical data to generate product recommendations, which are then displayed in-line within the social media environments to the users in step 1422. In one embodiment, the product recommendation comprises a promotional offer. Ongoing operations are then performed by the users in step 1424 to purchase the recommended products in-line within the social media environments and social commerce recommendation operations are ended in step 1426.

Figure 15:
FIG. 15 shows the selection of a merchant's products within a user interface window to generate an offer.

FIG. 15 shows the selection of a merchant's products within a user interface window implemented in accordance with an embodiment of the invention to generate an offer. In this embodiment, a social commerce storefront management module, as described in greater detail herein, is implemented within a window 154 of a user interface (UI) 1502. As shown in FIG. 15, the UI window 1504 comprises a 'Products' tab 1506, a plurality of product selection command buttons 1508, and corresponding product data display fields 1510. In various embodiments, an affiliate uses the plurality of product selection command buttons 1508, and corresponding product data display fields 1510 to select a product for a recommendation or an offer as described in greater detail herein.

Figure 16:
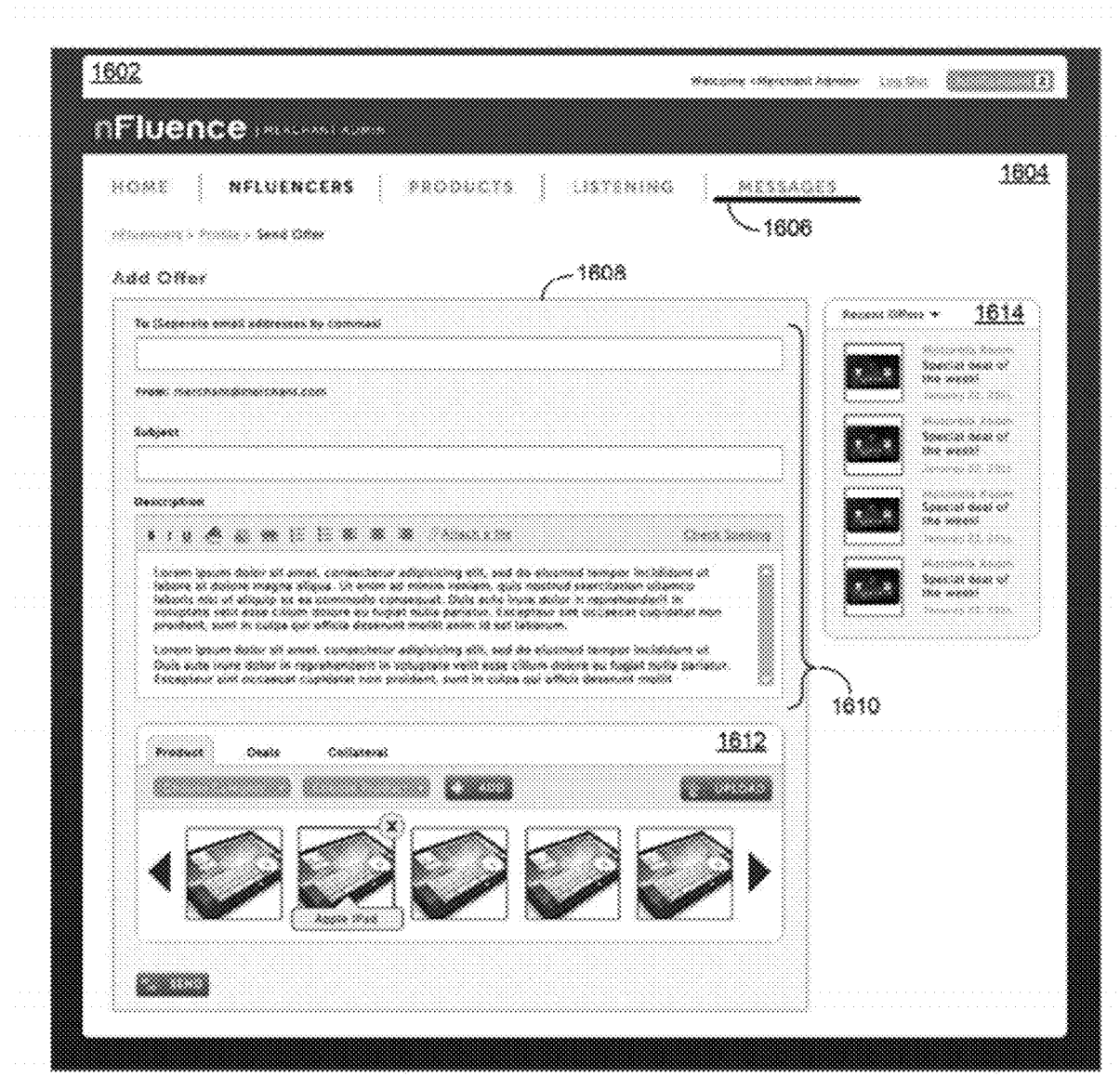
FIG. 16 shows the creation of an offer to a social media user within a user interface window.

FIG. 16 shows the creation of an offer to a social media user within a user interface window implemented in accordance with an embodiment of the invention. In this embodiment, a social commerce storefront management module, as described in greater detail herein, is implemented within a window 1604 of a user interface (UI) 1602. As shown in FIG. 16, the UI window 1604 comprises an 'Messages' tab 1606, an 'Offer' data entry form 1608, and a "Recent Offers" display sub-window comprising a plurality of recent offers. As shown in FIG. 16, the 'Offer' data entry form 1608 further comprises a plurality of offer data entry fields 1610 and a plurality of product selection thumbnails 1612. In various embodiments, the 'Offer' data entry form 1608 and the plurality of product selection thumbnails 1612 are used by the affiliate to generate an offer or a recommendation.

In these and other embodiments, the offer or recommendation is created for an individual, a subset, or a grouping of friends, family and associates. In one embodiment, the offer is created according to search terms used by individual social media users within the friends, family or associates. In another embodiment, the offer is created according to prior purchases made by individual social media users within the friends, family or associates. In yet another embodiment, the offer is created according to social commerce content that individual social media users within the friends, family or associates have accessed. In still another embodiment, the offer is created according to social commerce data associated with the affiliate's social commerce storefront. In one embodiment, the recommendation comprises a promotional offer. In these various embodiments, the social commerce data is provided to the affiliate by the merchant. Those of skill in the art will recognize that many such embodiments are possible and the foregoing is not intended to limit the spirit, scope or intent of the invention.

Figure 17:
FIG. 17 shows a product offer and its corresponding social commerce data within a user interface window.

FIG. 17 shows a product offer and its corresponding social commerce data within a user interface window implemented in accordance with an embodiment of the invention. In this embodiment, a social commerce storefront management module, as described in greater detail herein, is implemented within a window 1704 of a user interface (UI) 1702. As shown in FIG. 17, the UI window 1704 comprises an 'Products' tab 1706, an 'Offer' display sub-window 1708, and a plurality of social commerce performance measurement metrics 1714 associated with the offer and corresponding data 1716. As likewise shown in FIG. 17, the 'Offer' display sub-window 1708 comprises a plurality of product data 1710 associated with the offer and a graphic 1712 of the product.

Figure 18:
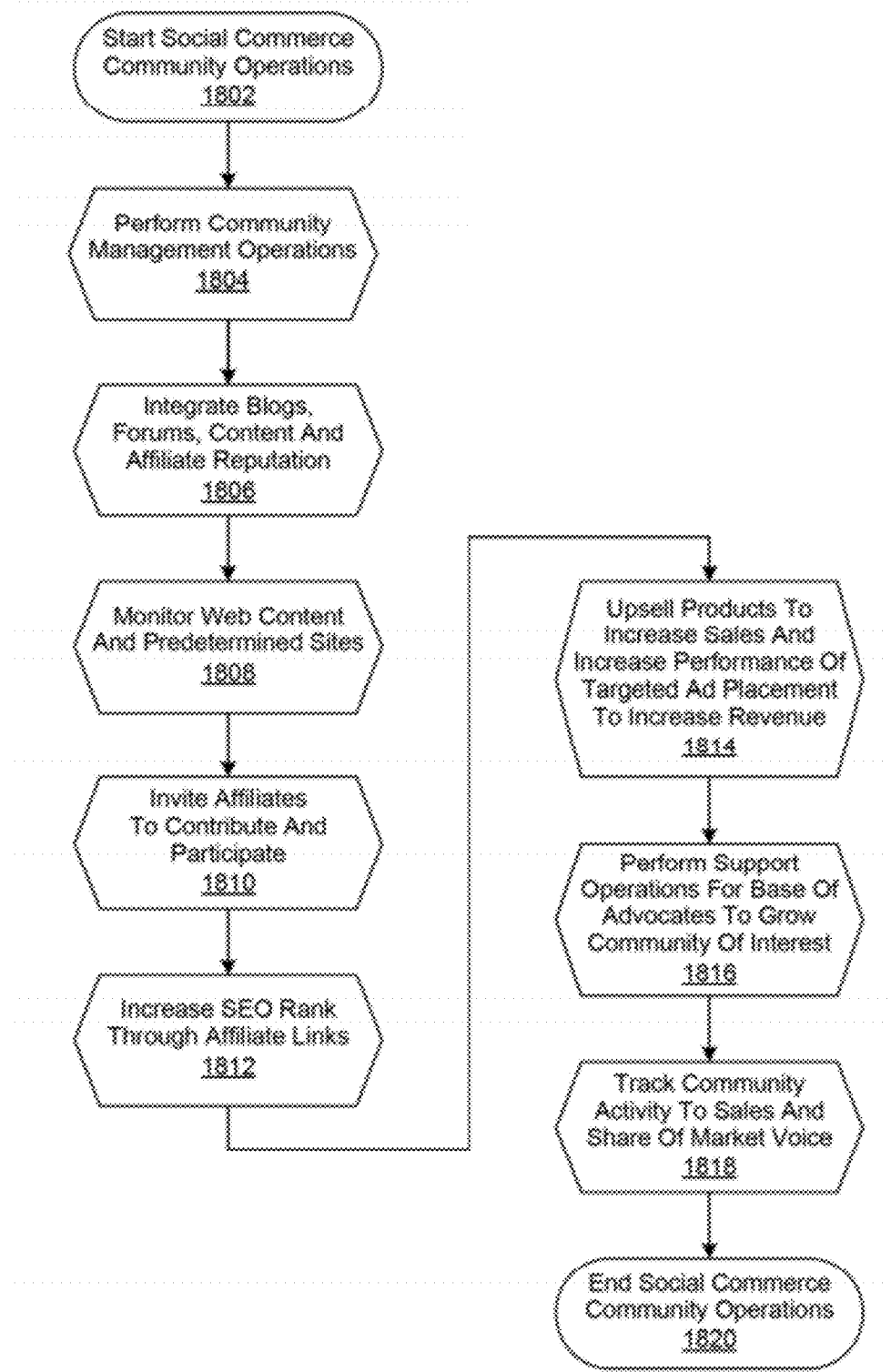
FIG. 18 is a generalized flow chart of the performance of social commerce community management operations.

FIG. 18 is a generalized flow chart of the performance of social commerce community management operations as implemented in accordance with an embodiment of the invention. In this embodiment, social commerce community management operations are begun in 1802, followed by the ongoing performance of community management operations in 1804. As an example, a merchant may manage a plurality of communities of interest that are associated with single or multiple social media environments. In various embodiments, these communities of interest may likewise be associated with individual or multiple affiliates and affiliate networks. Many such embodiments are possible and the foregoing is not intended to limit the spirit, scope or intent of the invention.

In step 1806, ongoing operations are performed to integrate blogs, forums, and various other social commerce content with the reputation rating of various affiliates. Ongoing operations are then performed in step 1808 to monitor web content and other data at predetermined web sites, followed by ongoing operations in step 1810 to invite affiliates to contribute social commerce content and participate in various social commerce activities and promotions. In step 1812, ongoing operations are performed to increase the search engine optimization (SEO) ranking of the merchant's web site, and the presentation of associated products, through affiliate links as described in greater detail herein. Ongoing operations are then performed in step 1814 to increase revenue by upselling products in order to increase product sales as well as the performance of targeted advertisement placement. In step 1816, ongoing support operations are performed for a base of advocates to grow predetermined communities of interest. Ongoing operations are then performed in step 1818 to track community of interest activity and corresponding share of market voice. Social commerce community operations are then ended in step 1820.

Figure 19:
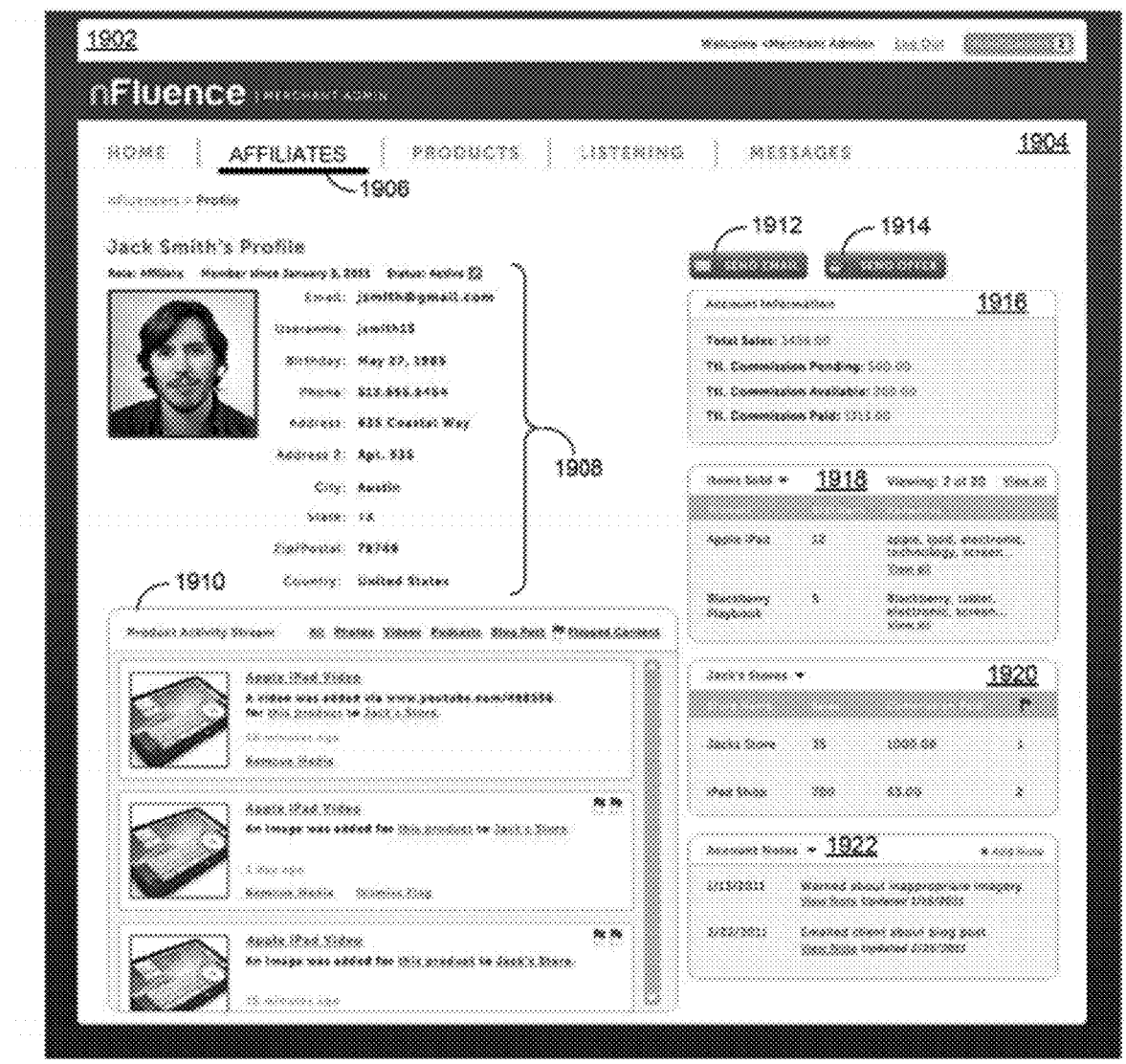
FIG. 19 shows the display of social commerce data associated with a predetermined affiliate within a user interface window.

FIG. 19 shows the display of social commerce data associated with a predetermined affiliate within a user interface window implemented in accordance with an embodiment of the invention. In this embodiment, a social commerce storefront management module, as described in greater detail herein, is implemented within a window 1904 of a user interface (UI) 1902. As shown in FIG. 19, the UI window 1904 comprises an 'Affiliates' tab 1906, a 'Send Email' 1912 command button and a 'Send Offer' command button 1914. As likewise shown in FIG. 19, the UI window 1904 comprises a plurality of data 1908 associated with a predetermined affiliate, and a "Product Activity" 1910 sub-window displaying data corresponding to social commerce content associated with the affiliate's social commerce storefront. The UI window 1904 likewise comprises 'Account Information' 1916, 'Items Sold' 1918, 'Commissions Paid' 1920, and 'Account Notes' 1922 data display windows, each of which displays associated social commerce data.

Figure 20:
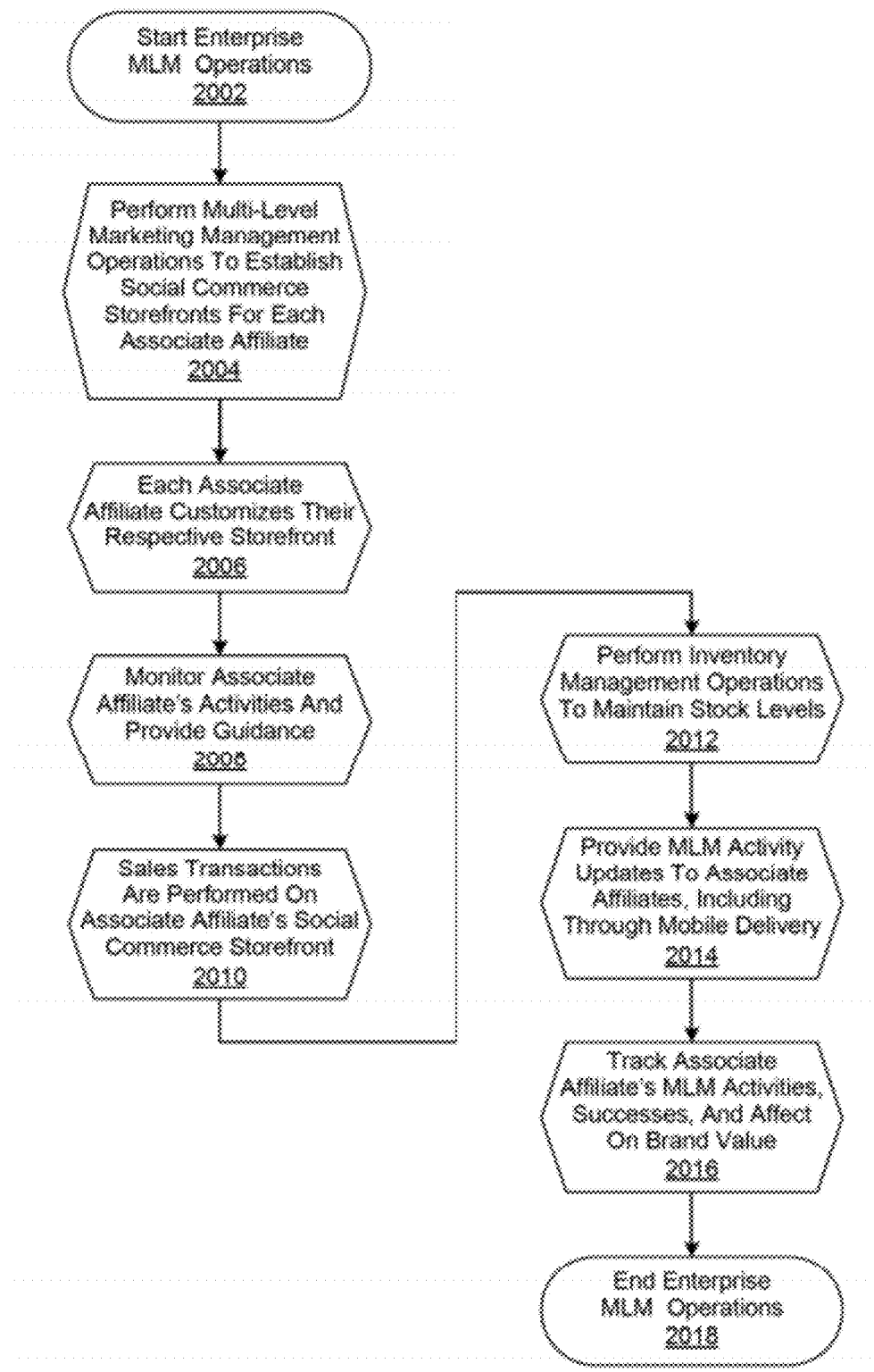
FIG. 20 is a generalized flow chart of the performance of social commerce multilevel marketing management operations.

FIG. 20 is a generalized flow chart of the performance of social commerce multilevel marketing management operations as implemented in accordance with an embodiment of the invention. In various embodiments, an affiliate of a merchant comprises a plurality of associated affiliates. As an example, an enterprise such as a corporation that provides consulting services may have multiple consultants, each of which is an associate affiliate by extension. In these and other embodiments, each associate affiliate may have one or more corresponding social commerce storefront that is unique to the associate affiliate. In this embodiment, enterprise multilevel marketing (MLM) operations are begun in step 2002, followed by the ongoing performance of MLM management operations to establish individual social commerce storefronts for each associate affiliate.

In step 2006, ongoing operations are performed by individual associate affiliates to customize and manage their respective social commerce storefront, followed by ongoing operations being performed in step 2008 to monitor their activities and provide guidance. In step 2010, ongoing sales transactions are performed, as described in greater detail herein, within each associate affiliate's social commerce storefront, followed by ongoing operations being performed in step 2012 to maintain merchant product stock levels. Ongoing operations are then performed in step 2014 to provide MLM activity updates to the associate affiliates, including through delivery to a mobile device, and ongoing operations are performed in step 2016 to track the associate affiliates' activities, successes, and effect on the merchant's brand value. Enterprise social commerce MLM activities are then ended in step 2018.

Figure 21:
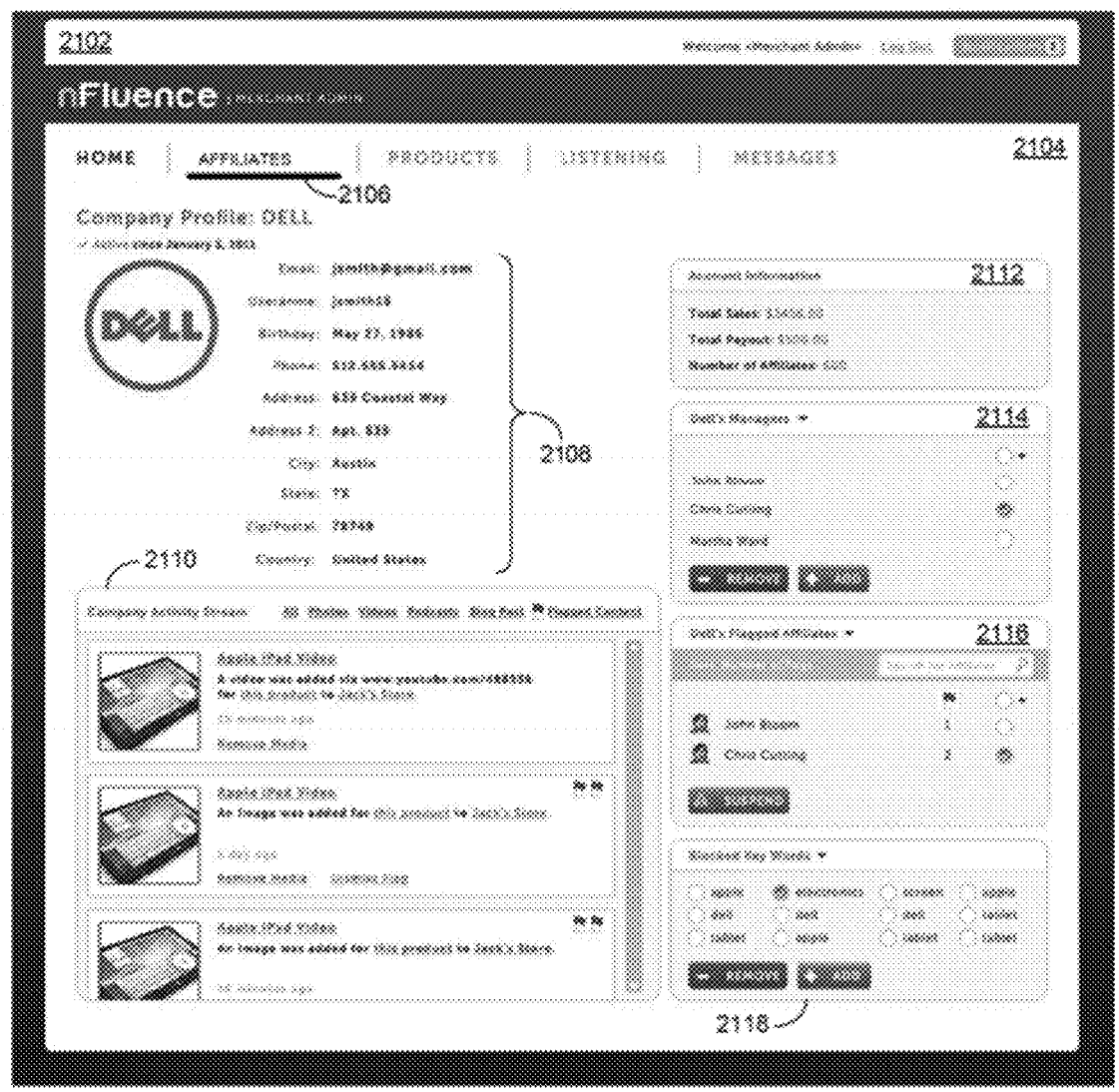
FIG. 21 shows the display of social commerce data associated with a predetermined multilevel marketing affiliate within a user interface window.

FIG. 21 shows the display of social commerce data associated with a predetermined multilevel marketing (MLM) affiliate within a user interface window implemented in accordance with an embodiment of the invention. In this embodiment, a social commerce storefront management module, as described in greater detail herein, is implemented within a window 2104 of a user interface (UI) 2102. As shown in FIG. 21, the UI window 2104 comprises an 'Affiliates' tab 2106, a MLM 'Account Information' 2112 data display window displaying a plurality of social commerce data associated with an MLM affiliate. The UI window 2104 likewise comprises a merchant MLM 'Managers' 2114 data display window displaying data associated with a merchant's MLM affiliate managers. As likewise shown in FIG. 19, the UI window 1904 comprises a 'Flagged Affiliates' data display window 2116 displaying various MLM associate affiliates that have been flagged for suspension and a 'Blocked Key Words' 2118 command button panel. The UI window 1904 likewise comprises a "Product Activity" 1910 sub-window displaying data corresponding to social commerce content associated with various MLM associate affiliates' social commerce storefronts.

Figure 22:
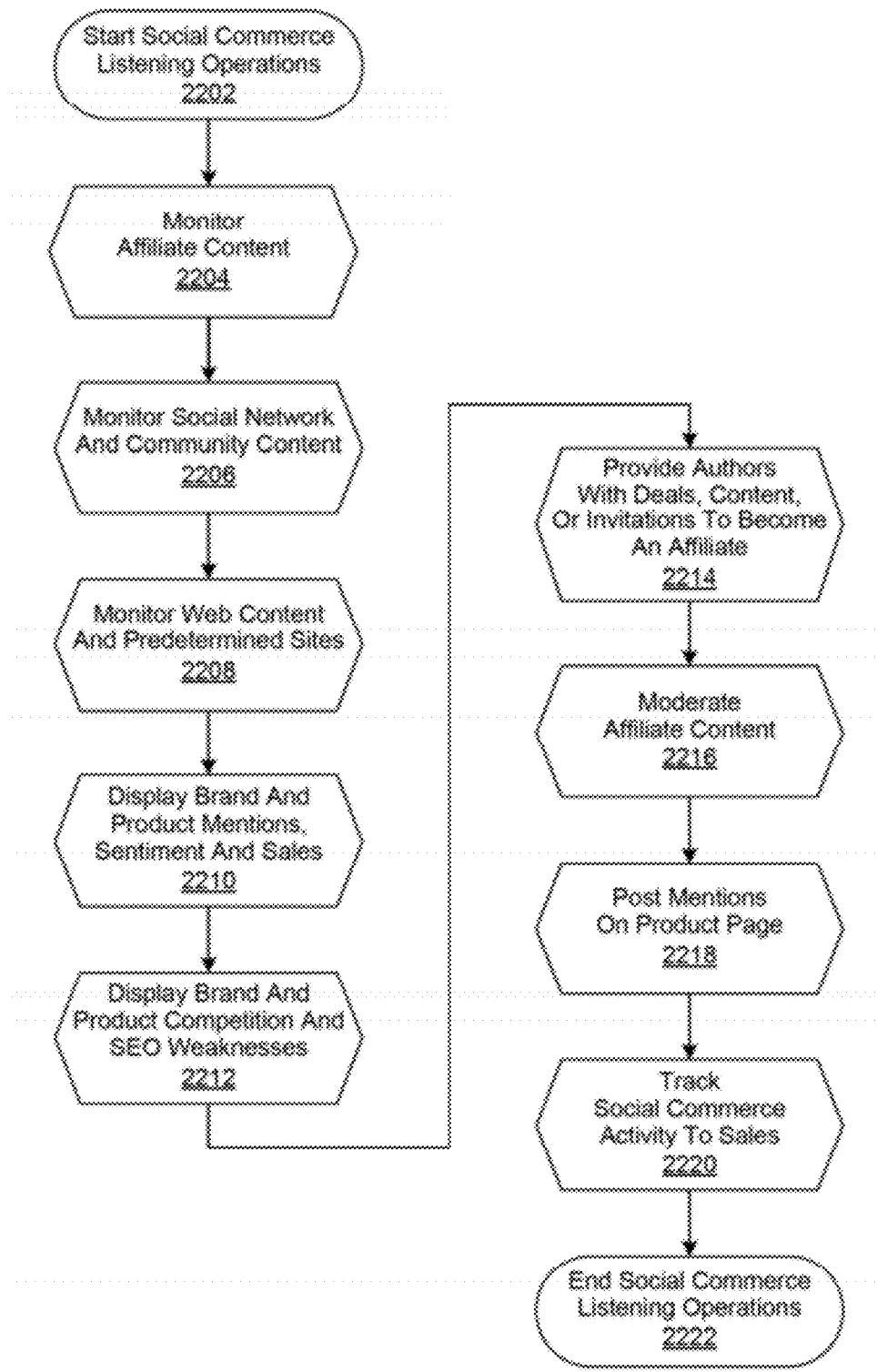
FIG. 22 is a generalized flow chart of the performance of social commerce listening operations.

FIG. 22 is a generalized flow chart of the performance of social commerce listening operations as implemented in accordance with an embodiment of the invention. In this embodiment, social commerce listening operations are begun in step 2201, followed by ongoing operations in step 2204 to monitor social commerce content associated with affiliates. In step 2206, ongoing operations are performed to monitor non-social-commerce content within various social media environments and associated communities of interest, followed by ongoing operations in step 2208 to monitor non-social-commerce content within various predetermined web sites. Ongoing operations are then performed in step 2210 to display the merchant's brand, product mentions, sentiment, and sales within various social commerce venues, followed by operations being performed in step 2212 to display competitor's brands, product competition, and search engine optimization (SEO) weaknesses.

In step 2214, ongoing operations are performed to provide various social media content authors with promotional deals, additional source content, or invitations to become an affiliate of the merchant. Ongoing operations are then performed in step 2216 to monitor social commerce content provided by affiliates, followed by ongoing operations in step 2218 to post product mentions on the respective product page within various affiliate social commerce storefronts. In step 2220, ongoing operations are performed to track social commerce activity leading to sales of purchasable products and social commerce listening operations are ended in step 2222.

Figure 23:
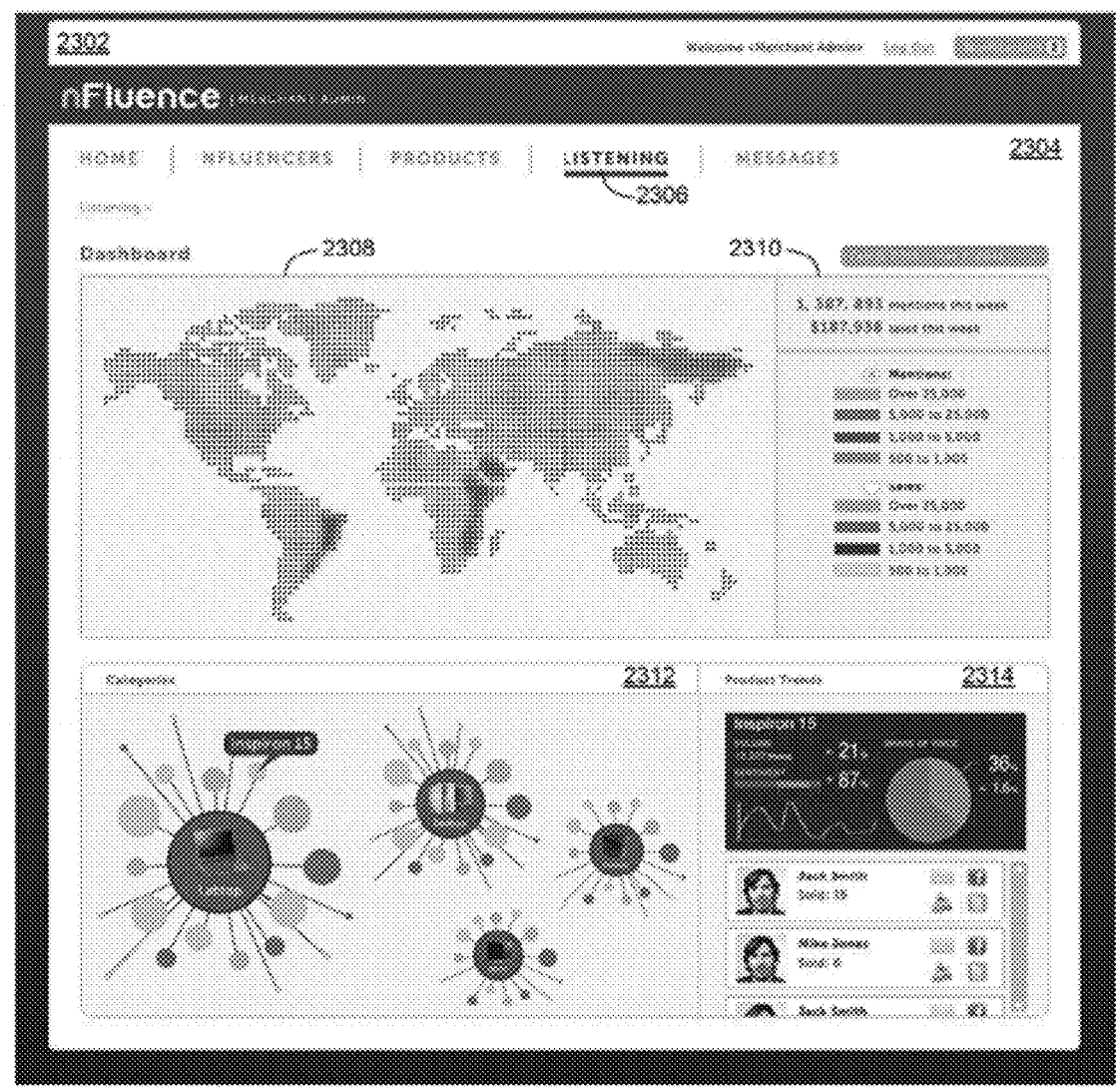
FIG. 23 shows the display of social commerce data associated with a plurality of affiliates marketing a plurality of merchant products within a user interface window.

FIG. 23 shows the display of social commerce data associated with a plurality of affiliates marketing a plurality of merchant products within a user interface window implemented in accordance with an embodiment of the invention. In this embodiment, a social commerce storefront management module, as described in greater detail herein, is implemented within a window 2304 of a user interface (UI) 2302. As shown in FIG. 23, the UI window 2304 comprises a 'Listening' tab 2306, a 'Dashboard' graphics window 2308 displaying a graphical depiction of sales activity associated with a plurality of affiliates, and a corresponding data display 2310 window displaying associated social commerce summary data. As likewise shown in FIG. 23, the UI window 2304 comprises a 'Categories' graphics window 2312 graphically depicting various products. The UI window 2304 likewise comprises a corresponding 'Product Trends' 2314 data display window displaying product trend data associated with various products graphically depicted in the 'Categories' graphics window 2312.

Figure 24:
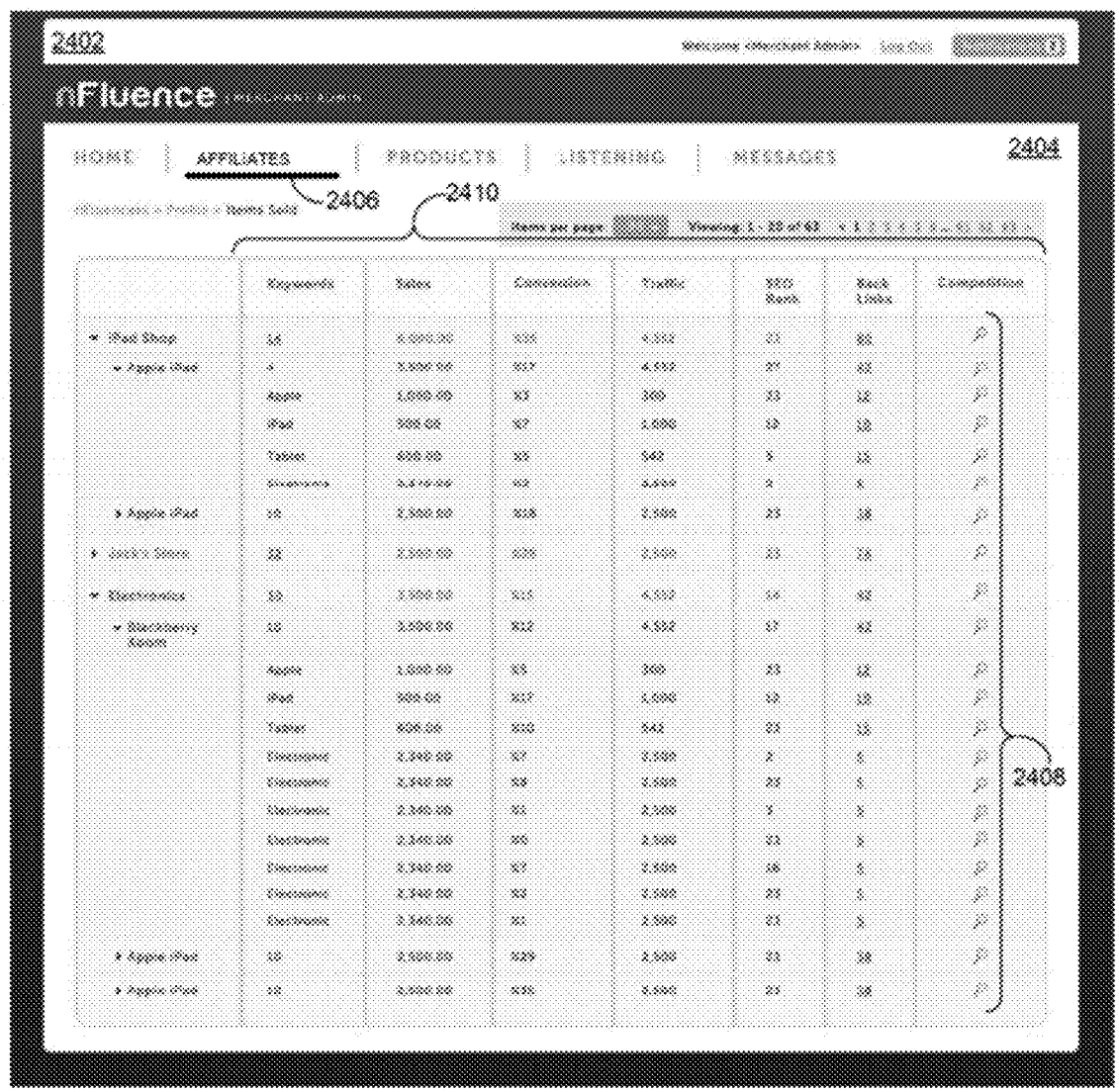
FIG. 24 shows the display of social commerce data associated with a plurality of merchant products within a user interface window.

FIG. 24 shows the display of social commerce data associated with a plurality of merchant products within a user interface window implemented in accordance with an embodiment of the invention. In this embodiment, a social commerce storefront management module, as described in greater detail herein, is implemented within a window 2404 of a user interface (UI) 2402. As shown in FIG. 24, the UI window 2404 comprises an 'Affiliates' tab 24306, a plurality of social commerce metrics 2410 corresponding to a plurality of products sold in various social commerce storefronts.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A computer-implementable method executing on a hardware processor for automating the administration of social commerce within a social media environment, comprising:

processing social commerce activity data within the social media environment corresponding to a plurality of social commerce sites to generate social commerce analysis data, the plurality of social commerce sites comprising respective social commerce storefronts embedded within respective social media sites, the plurality of social commerce sites associated with a provider of a set of available products and further associated with a corresponding plurality of affiliates of the provider of a set of available products, each social commerce storefront comprising a catalog of at least some of the set of purchasable products, the social media site comprising social commerce content associated with the at least some of the set of purchasable products, the plurality of affiliates of the provider participating in an affiliate network, the affiliate network allowing participation in an affiliate program, the processing social commerce activity executing on the hardware processor;

processing the social commerce analysis data to generate social commerce recommendation data, the processing social commerce analysis data executing on the hardware processor; and providing the social commerce recommendation data to the corresponding plurality of affiliates, the providing the social commerce recommendation data executing on the hardware processor; and wherein the social media environment comprises a social network management module, the social network management module managing linkages between the social media environment and the plurality of social commerce sites; and, each respective social commerce storefront comprises a respective affiliate storefront management module executing on a respective hardware processor, each respective affiliate storefront management module managing the respective social commerce storefront, the managing comprising receiving the social commerce recommendation data and using the social commerce recommendation data to display a representation of a product corresponding to the social commerce recommendation data within the respective social commerce storefront to enable users to purchase the product associated with the social commerce recommendation data.

2. The method of claim 1, wherein the social commerce analysis data comprises product purchase data corresponding to the purchase of a first set of purchasable products by a user associated with the affiliate, the first set of purchasable products comprising a subset of the set of available products.

3. The method of claim 2, wherein the social commerce recommendation data is provided to the user and comprises a recommendation for a second set of purchasable products.

4. The method of claim 1, wherein the social commerce analysis data comprises search term data used by a user associated with the affiliate, the search term data associated with a first set of purchasable products purchased by the user, the first set of purchasable products comprising a subset of the set of available products.

5. The method of claim 4, wherein the social commerce recommendation data is provided to the user and comprises a recommendation for a second set of purchasable products.

6. The method of claim 1, wherein the social commerce recommendation data is provided to the user and comprises a promotional offer.

7. A system comprising:
a processor;
a data bus coupled to the processor; and
a computer-usable medium embodying computer program code, the computer-usable medium being coupled to the data bus, the computer program code interacting with a plurality of computer operations and comprising instructions executable by the processor and configured for:
processing social commerce activity data within a social media environment corresponding to a plurality of social commerce sites to generate social commerce analysis data, the plurality of social commerce sites comprising respective social commerce storefronts embedded within respective social media sites, the plurality of social commerce sites associated with a provider of a set of available products and further associated with a corresponding plurality of affiliates of the provider of a set of available products, each social commerce storefront comprising a catalog of at least some of the set of purchasable products, the social media site comprising social commerce content associated with the at least some of the set of purchasable products, the plurality of affiliates of the provider participating in an affiliate network, the affiliate network allowing participation in an affiliate program, the processing social commerce activity executing on the hardware processor;
processing the social commerce analysis data to generate social commerce recommendation data; and
providing the social commerce recommendation data to the corresponding plurality of affiliates; and wherein
the social media environment comprises a social network management module, the social network management module managing linkages between the social media environment and the plurality of social commerce sites; and,
each respective social commerce storefront comprises a respective affiliate storefront management module executing on a respective hardware processor, each respective affiliate storefront management module managing the respective social commerce storefront, the managing comprising receiving the social commerce recommendation data and using the social commerce recommendation data to display a representation of a product corresponding to the social commerce recommendation data within the respective social commerce storefront to enable users to purchase the product associated with the social commerce recommendation data.

8. The system of claim 7, wherein the social commerce analysis data comprises product purchase data corresponding to the purchase of a first set of purchasable products by a user associated with the affiliate, the first set of purchasable products comprising a subset of the set of available products.

9. The system of claim 8, wherein the social commerce recommendation data is provided to the user and comprises a recommendation for a second set of purchasable products.

10. The system of claim 7, wherein the social commerce analysis data comprises search term data used by a user associated with the affiliate, the search term data associated with a first set of purchasable products purchased by the user, the first set of purchasable products comprising a subset of the set of available products.

11. The system of claim 10, wherein the social commerce recommendation data is provided to the user and comprises a recommendation for a second set of purchasable products.

12. The system of claim 7, wherein the social commerce recommendation data is provided to the user and comprises a promotional offer.

13. A non-transitory computer-usable medium embodying computer program code, the computer program code comprising computer executable instructions configured for:
processing social commerce activity data within a social media environment corresponding to a plurality of social commerce sites to generate social commerce analysis data, the plurality of social commerce sites comprising respective social commerce storefronts embedded within respective social media sites, the plurality of social commerce sites associated with a provider of a set of available products and further associated with a corresponding plurality of affiliates of the provider of a set of available products, each social commerce storefront comprising a catalog of at least some of the set of purchasable products, the social media site comprising social commerce content associated with the at least some of the set of purchasable products, the plurality of affiliates of the provider participating in an affiliate network, the affiliate network allowing participation in an affiliate program;
processing the social commerce analysis data to generate social commerce recommendation data; and
providing the social commerce recommendation data to the corresponding plurality of affiliates; and wherein
the social media environment comprises a social network management module, the social network management module managing linkages between the social media environment and the plurality of social commerce sites; and,
each respective social commerce storefront comprises a respective affiliate storefront management module executing on a respective hardware processor, each respective affiliate storefront management module managing the respective social commerce storefront, the managing comprising receiving the social commerce recommendation data and using the social commerce recommendation data to display a representation of a product corresponding to the social commerce recommendation data within the respective social commerce storefront to enable users to purchase the product associated with the social commerce recommendation data.

14. The computer usable medium of claim 13, wherein the social commerce analysis data comprises product purchase data corresponding to the purchase of a first set of purchasable products by a user associated with the affiliate, the first set of purchasable products comprising a subset of the set of available products.

15. The computer usable medium of claim 14, wherein the social commerce recommendation data is provided to the user and comprises a recommendation for a second set of purchasable products.

16. The computer usable medium of claim 13, wherein the social commerce analysis data comprises search term data used by a user associated with the affiliate, the search term data associated with a first set of purchasable products purchased by the user, the first set of purchasable products comprising a subset of the set of available products.

17. The computer usable medium of claim 16, wherein the social commerce recommendation data is provided to the user and comprises a recommendation for a second set of purchasable products.

18. The computer usable medium of claim 13, wherein the social commerce recommendation data is provided to the user and comprises a promotional offer.

19. The computer usable medium of claim 13, wherein the computer executable instructions are deployable to a client computer from a server at a remote location.

20. The computer usable medium of claim 13, wherein the computer executable instructions are provided by a service provider to a customer on an on-demand basis.

* * * * *